US011627018B2

(12) United States Patent
Kutz et al.

(10) Patent No.: US 11,627,018 B2
(45) Date of Patent: Apr. 11, 2023

(54) REFERENCE SIGNAL DESIGN FOR CHANNEL ESTIMATION AND POWER AMPLIFIER MODELING

(71) Applicant: QUALCOMM Incorporated, San Diego, CA (US)

(72) Inventors: Gideon Shlomo Kutz, Ramat Hasharon (IL); Shay Landis, Hod Hasharon (IL); Idan Michael Horn, Hod Hasharon (IL); Amit Bar-Or Tillinger, Tel-Aviv (IL)

(73) Assignee: QUALCOMM INCORPORATED, San Diego, CA (US)

( * ) Notice: Subject to any disclaimer, the term of this patent is extended or adjusted under 35 U.S.C. 154(b) by 90 days.

(21) Appl. No.: 17/374,876

(22) Filed: Jul. 13, 2021

(65) Prior Publication Data

US 2023/0016303 A1    Jan. 19, 2023

(51) Int. Cl.
*H04L 25/02* (2006.01)
*H04L 27/26* (2006.01)
*H04W 72/04* (2009.01)
*H04W 72/0446* (2023.01)
*H04L 5/00* (2006.01)

(52) U.S. Cl.
CPC ........ *H04L 25/0202* (2013.01); *H04L 5/0048* (2013.01); *H04L 27/2614* (2013.01); *H04W 72/0446* (2013.01)

(58) Field of Classification Search
None
See application file for complete search history.

(56) References Cited

U.S. PATENT DOCUMENTS

| | | | |
|---|---|---|---|
| 2010/0048237 A1* | 2/2010 | Kishiyama | H04W 52/242 455/522 |
| 2010/0103891 A1* | 4/2010 | Okubo | H04L 5/0053 370/329 |
| 2010/0182923 A1* | 7/2010 | Miki | H04L 1/0026 370/252 |
| 2017/0331577 A1* | 11/2017 | Parkvall | H04W 4/00 |
| 2018/0242327 A1* | 8/2018 | Frenne | H04L 25/0204 |
| 2019/0159136 A1* | 5/2019 | MolavianJazi | H04L 5/001 |
| 2019/0342052 A1* | 11/2019 | Hu | H04L 5/0007 |
| 2020/0186221 A1* | 6/2020 | Frenne | H04B 7/0626 |

* cited by examiner

*Primary Examiner* — Sai Aung
(74) *Attorney, Agent, or Firm* — Holland & Hart LLP

(57) ABSTRACT

Methods, systems, and devices for wireless communications are described. A user equipment (UE) may perform both a channel estimation and a non-linearity estimation (e.g., a power amplifier (PA) model estimation) on a demodulation reference signal (DMRS) transmitted by a base station. For example, the DMRS may include two portions that correspond to two peak-to-average power ratio (PAPR) values. Low PAPR values may enable the UE to perform the channel estimation, and high PAPR values may enable the UE to perform the PA non-linearity estimation. Accordingly, a first portion of the DMRS may correspond to a lower PAPR value, and the second portion of the DMRS may correspond to a higher PAPR value. In some examples, the base station may signal different parameters for each portion of the DMRS to the UE, or the UE may use fixed values to receive each portion of the DMRS.

30 Claims, 18 Drawing Sheets

REFERENCE SIGNAL DESIGN FOR CHANNEL ESTIMATION AND POWER AMPLIFIER MODELING

FIELD OF TECHNOLOGY

The following relates to wireless communications, including reference signal design for channel estimation and power amplifier (PA) modeling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some examples, communications between a base station and a UE may be subjected to non-linearity errors introduced by different models applied to the communications. Techniques are desired for clearing these non-linearity errors to improve communications.

SUMMARY

The described techniques relate to improved methods, systems, devices, and apparatuses that support reference signal design for channel estimation and power amplifier (PA) modeling. Generally, the described techniques provide for signaling of a demodulation reference signal (DMRS) that enables both a channel estimation and a PA model estimation (e.g., a non-linearity estimation) at a user equipment (UE). To enable this joint estimation, this DMRS may include two portions that correspond to two peak-to-average power ratio (PAPR) values (e.g., a first portion of the DMRS includes a first PAPR and a second portion of the DMRS includes a second PAPR). Low PAPR values may enable the UE to perform the channel estimation, and high PAPR values may enable the UE to perform the PA non-linearity estimation. Accordingly, a first portion of the DMRS may correspond to a lower PAPR value, and the second portion of the DMRS may correspond to a higher PAPR value. In some examples, the UE may determine which portion of the DMRS corresponds to which PAPR level for the respective estimation to perform based on a roll-off value, constellation, filter, etc. configured or specified for each portion of the DMRS. Additionally, the base station may signal different parameters (e.g., constellation, roll-off factors, etc.) for each portion of the DMRS to the UE, or the UE may use fixed values to receive each portion of the DMRS (e.g., known or predefined at the UE).

A method for wireless communications at a UE is described. The method may include receiving, from a base station, control signaling indicating the base station is to transmit a DMRS including a first portion and a second portion; receiving, from the base station, the DMRS including the first portion and the second portion in accordance with the control signaling, the first portion corresponding to a first roll-off factor and the second portion corresponding to a second roll-off factor; performing a channel estimation on the first portion of the DMRS based on the first roll-off factor; performing a PA model estimation on the second portion of the DMRS based on the second roll-off factor and the channel estimation; and processing a data transmission received from the base station in accordance with the channel estimation and the PA model estimation.

An apparatus for wireless communications at a UE is described. The apparatus may include a processor, memory coupled with the processor, and instructions stored in the memory. The instructions may be executable by the processor to cause the apparatus to receive, from a base station, control signaling indicating the base station is to transmit a DMRS including a first portion and a second portion; to receive, from the base station, the DMRS including the first portion and the second portion in accordance with the control signaling, the first portion corresponding to a first roll-off factor and the second portion corresponding to a second roll-off factor; to perform a channel estimation on the first portion of the DMRS based on the first roll-off factor; to perform a PA model estimation on the second portion of the DMRS based on the second roll-off factor and the channel estimation; and to process a data transmission received from the base station in accordance with the channel estimation and the PA model estimation.

Another apparatus for wireless communications at a UE is described. The apparatus may include means for receiving, from a base station, control signaling indicating the base station is to transmit a DMRS including a first portion and a second portion; means for receiving, from the base station, the DMRS including the first portion and the second portion in accordance with the control signaling, the first portion corresponding to a first roll-off factor and the second portion corresponding to a second roll-off factor; means for performing a channel estimation on the first portion of the DMRS based on the first roll-off factor; means for performing a PA model estimation on the second portion of the DMRS based on the second roll-off factor and the channel estimation; and means for processing a data transmission received from the base station in accordance with the channel estimation and the PA model estimation.

A non-transitory computer-readable medium storing code for wireless communications at a UE is described. The code may include instructions executable by a processor to receive, from a base station, control signaling indicating the base station is to transmit a DMRS including a first portion and a second portion; to receive, from the base station, the DMRS including the first portion and the second portion in accordance with the control signaling, the first portion corresponding to a first roll-off factor and the second portion corresponding to a second roll-off factor; to perform a channel estimation on the first portion of the DMRS based on the first roll-off factor; to perform a PA model estimation on the second portion of the DMRS based on the second roll-off factor and the channel estimation; and to process a data transmission received from the base station in accordance with the channel estimation and the PA model estimation.

Some examples of the method, apparatuses, and non-transitory computer-readable medium described herein may further include operations, features, means, or instructions for receiving, from the base station, a control message including a set of multiple transmission parameters for each portion of the DMRS, where the DMRS may be received based on the set of multiple transmission parameters.

In some examples of the method, apparatuses, and non-transitory computer-readable medium described herein, the set of multiple transmission parameters includes a roll-off factor for each portion of the DMRS, a constellation used for each portion of the DMRS, or a combination thereof.

In some examples of the method, apparatuses, and non-transitory computer-readable medium described herein, receiving the DMRS may include operations, features, means, or instructions for receiving each portion of the DMRS based on fixed transmission parameter values for the first portion and the second portion, where the fixed transmission parameter values for the first portion and the second portion may be identified based on receiving the control signaling.

Some examples of the method, apparatuses, and non-transitory computer-readable medium described herein may further include operations, features, means, or instructions for transmitting, to the base station, a request to update a channel estimation model, where the control signaling may be received based on transmitting the request.

Some examples of the method, apparatuses, and non-transitory computer-readable medium described herein may further include operations, features, means, or instructions for receiving, from the base station, a request to update a channel estimation model, where the control signaling may be received based on receiving the request.

In some examples of the method, apparatuses, and non-transitory computer-readable medium described herein, the first portion of the DMRS may include a first PAPR for performing the channel estimation, and the second portion of the DMRS may include a second PAPR for performing the PA model estimation, the second PAPR being higher than the first PAPR.

In some examples of the method, apparatuses, and non-transitory computer-readable medium described herein, receiving the DMRS including the first portion and the second portion may include operations, features, means, or instructions for receiving the first portion of the DMRS on a first set of time-domain resources of the DMRS and receiving the second portion of the DMRS on a second set of time-domain resources of the DMRS.

In some examples of the method, apparatuses, and non-transitory computer-readable medium described herein, the first roll-off factor may be used for a first shaping filter applied to the first portion of the DMRS, and the second roll-off factor may be used for a second shaping filter applied to the second portion of the DMRS, where the first shaping filter and the second shaping filter may be a same pulse shaping filter or different pulse shaping filters.

In some examples of the method, apparatuses, and non-transitory computer-readable medium described herein, the second roll-off factor and a constellation order used for the second portion of the DMRS may be a same roll-off factor and a same constellation order used for the data transmission.

In some examples of the method, apparatuses, and non-transitory computer-readable medium described herein, the PA model estimation may include a PA non-linearity model estimation used to estimate a non-linearity error for a digital post distortion (DPoD) algorithm.

In some examples of the method, apparatuses, and non-transitory computer-readable medium described herein, the DMRS including the two portions may include a single carrier waveform.

A method for wireless communications at a base station is described. The method may include transmitting, to a UE, control signaling indicating the base station is to transmit a DMRS including a first portion and a second portion; determining a first PAPR for the first portion of the DMRS and a second PAPR for the second portion of the DMRS; transmitting, to the UE, the DMRS including the first portion and the second portion in accordance with the control signaling, the first portion including the first PAPR and the second portion including the second PAPR; and transmitting, to the UE, a data transmission in accordance with a channel estimation corresponding to the first portion and a PA model estimation corresponding to the second portion and the channel estimation.

An apparatus for wireless communications at a base station is described. The apparatus may include a processor, memory coupled with the processor, and instructions stored in the memory. The instructions may be executable by the processor to cause the apparatus to transmit, to a UE, control signaling indicating the base station is to transmit a DMRS including a first portion and a second portion; to determine a first PAPR for the first portion of the DMRS and a second PAPR for the second portion of the DMRS; to transmit, to the UE, the DMRS including the first portion and the second portion in accordance with the control signaling, the first portion including the first PAPR and the second portion including the second PAPR; and to transmit, to the UE, a data transmission in accordance with a channel estimation corresponding to the first portion and a PA model estimation corresponding to the second portion and the channel estimation.

Another apparatus for wireless communications at a base station is described. The apparatus may include means for transmitting, to a UE, control signaling indicating the base station is to transmit a DMRS including a first portion and a second portion; means for determining a first PAPR for the first portion of the DMRS and a second PAPR for the second portion of the DMRS; means for transmitting, to the UE, the DMRS including the first portion and the second portion in accordance with the control signaling, the first portion including the first PAPR and the second portion including the second PAPR; and means for transmitting, to the UE, a data transmission in accordance with a channel estimation corresponding to the first portion and a PA model estimation corresponding to the second portion and the channel estimation.

A non-transitory computer-readable medium storing code for wireless communications at a base station is described. The code may include instructions executable by a processor to transmit, to a UE, control signaling indicating the base station is to transmit a DMRS including a first portion and a second portion; to determine a first PAPR for the first portion of the DMRS and a second PAPR for the second portion of the DMRS; to transmit, to the UE, the DMRS including the first portion and the second portion in accordance with the control signaling, the first portion including the first PAPR and the second portion including the second PAPR; and to transmit, to the UE, a data transmission in accordance with a channel estimation corresponding to the first portion and a PA model estimation corresponding to the second portion and the channel estimation.

Some examples of the method, apparatuses, and non-transitory computer-readable medium described herein may further include operations, features, means, or instructions for transmitting, to the UE, a control message including a set of multiple transmission parameters for each portion of the DMRS, where the DMRS may be transmitted based on the set of multiple transmission parameters.

In some examples of the method, apparatuses, and non-transitory computer-readable medium described herein, the set of multiple transmission parameters may include a roll-off factor for each portion of the DMRS, a constellation used for each portion of the DMRS, or a combination thereof.

In some examples of the method, apparatuses, and non-transitory computer-readable medium described herein, transmitting the DMRS may include operations, features, means, or instructions for transmitting each portion of the DMRS based on fixed transmission parameter values for the first portion and the second portion.

Some examples of the method, apparatuses, and non-transitory computer-readable medium described herein may further include operations, features, means, or instructions for receiving, from the UE, a request to update a channel estimation model, where the control signaling may be transmitted based on receiving the request.

Some examples of the method, apparatuses, and non-transitory computer-readable medium described herein may further include operations, features, means, or instructions for transmitting, to the UE, a request to update a channel estimation model, where the control signaling may be transmitted based on transmitting the request.

In some examples of the method, apparatuses, and non-transitory computer-readable medium described herein, determining the first PAPR and the second PAPR may include operations, features, means, or instructions for determining a first roll-off factor and a first constellation for the first portion of the DMRS, where the first PAPR may be determined based on the first roll-off factor and the first constellation; and determining a second roll-off factor and a second constellation for the second portion of the DMRS, where the second PAPR may be determined based on the second roll-off factor and the second constellation.

In some examples of the method, apparatuses, and non-transitory computer-readable medium described herein, the first roll-off factor may be used for a first shaping filter applied to the first portion of the DMRS, and the second roll-off factor may be used for a second shaping filter applied to the second portion of the DMRS, where the first shaping filter and the second shaping filter may be a same pulse shaping filter or different pulse shaping filters.

In some examples of the method, apparatuses, and non-transitory computer-readable medium described herein, the second roll-off factor and the second constellation for the second portion of the DMRS may be a same roll-off factor and a same constellation order used for the data transmission.

In some examples of the method, apparatuses, and non-transitory computer-readable medium described herein, transmitting the DMRS including the first portion and the second portion may include operations, features, means, or instructions for transmitting the first portion of the DMRS on a first set of time-domain resources of the DMRS and transmitting the second portion of the DMRS on a second set of time-domain resources of the DMRS.

In some examples of the method, apparatuses, and non-transitory computer-readable medium described herein, the PA model estimation may include a PA non-linearity model estimation used to estimate a non-linearity error for a DPoD algorithm.

In some examples of the method, apparatuses, and non-transitory computer-readable medium described herein, the DMRS including the two portions may include a single carrier waveform.

DETAILED DESCRIPTION

Figure 1:
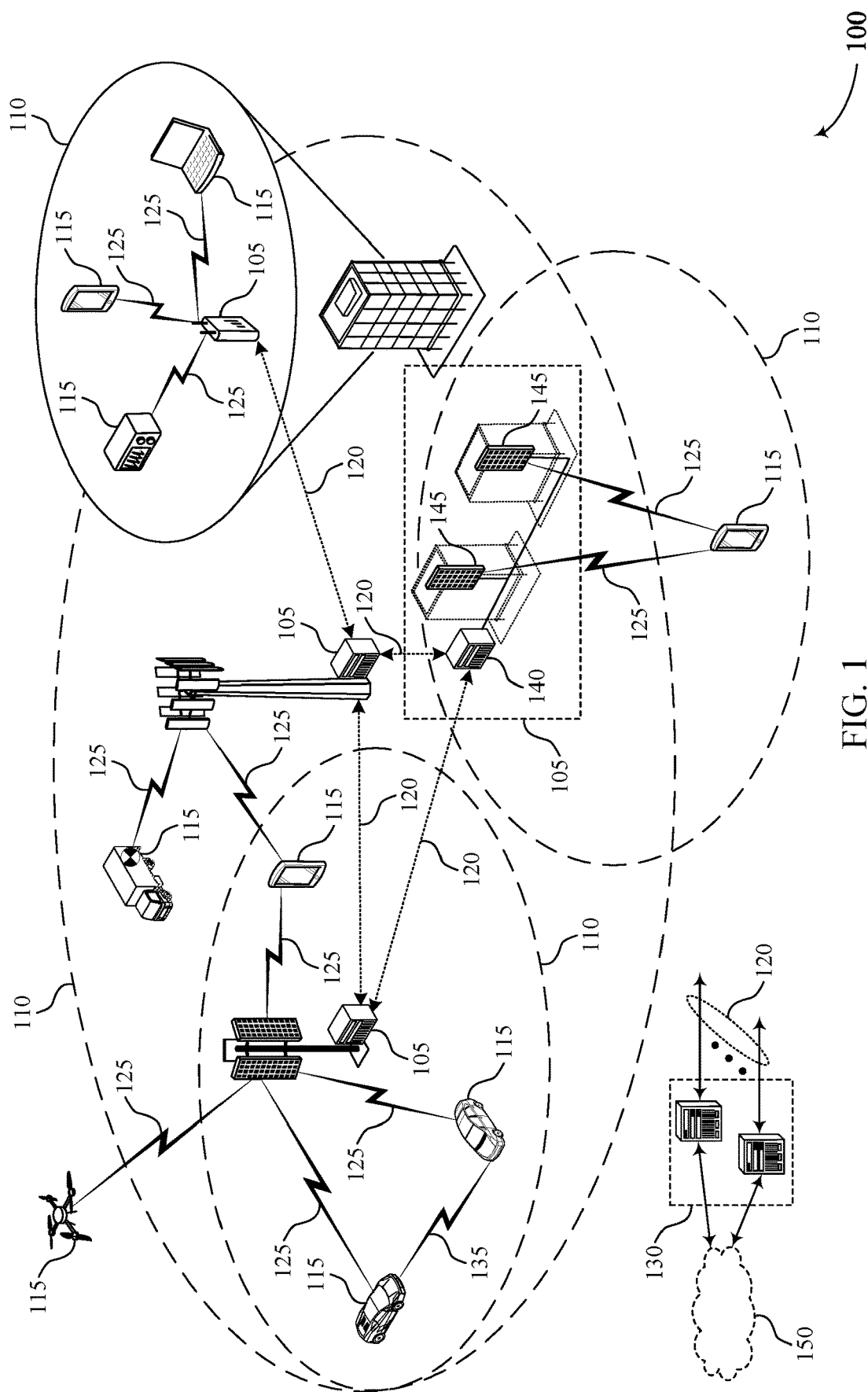
FIG. 1 illustrates an example of a wireless communications system that supports reference signal design for channel estimation and power amplifier (PA) modeling in accordance with aspects of the present disclosure.

When communicating with a base station, a user equipment (UE) may use a Digital Post Distortion (DPoD) algorithm applied at a DPoD receiver at the UE to clear non-linear noise that is generated by a known model. In many cases, the non-linear noise is due to power amplifier (PA) distortion. For example, a non-linearity may be applied to a channel (e.g., based on using a PA) at a base station transmitter side (e.g., or other type of transmitting device) before communications occur on the channel, resulting in the UE receiving distorted signals on the channel due to the non-linearity. Accordingly, the UE may use the DPoD algorithm to determine the non-linearity to remove non-linear errors from signals received from the base station to more accurately receive and decode the signals. In some cases, the UE may use the DPoD algorithm to remove non-linear errors generated by a PA model used by the base station, such that using the DPoD algorithm (e.g., as part of a DPoD correction process) may be dependent on accurate estimation of a PA model. Efficient techniques are desired for enabling the UE to estimate a PA model.

As described herein, a base station may use a demodulation reference signal (DMRS) configuration for transmitting a single carrier waveform that enables a UE to efficiently perform both a channel estimation and a PA non-linearity estimation (e.g., PA model estimation) using the DMRS. To enable this joint estimation, this DMRS may include two portions that correspond to two peak-to-average power ratio (PAPR) values (e.g., a first portion of the DMRS includes a first PAPR and a second portion of the DMRS includes a second PAPR). Low PAPR values may enable the UE to perform the channel estimation, and high PAPR values may enable the UE to perform the PA non-linearity estimation. Accordingly, a first portion of the DMRS may correspond to a lower PAPR value, and the second portion of the DMRS may correspond to a higher PAPR value.

In some examples, PAPR may be determined based on a used constellation for a corresponding portion of the DMRS transmission and a pulse shaping filter (e.g., with a particular roll-off value for the filter) used for that corresponding portion of the DMRS transmission. Additionally, the UE may determine which portion of the DMRS corresponds to which PAPR level for the respective estimation to perform based on a roll-off value, constellation, filter, etc. configured or specified for each portion of the DMRS. In some examples, the base station may signal different parameters (e.g., constellation, roll-off factors, etc.) for each portion of the DMRS to the UE, or the UE may use fixed values for each portion of the DMRS (e.g., known or predefined at the UE). Additionally, the base station may transmit an indication to the UE to indicate that this new DMRS configuration is being used prior to transmitting the DMRS. In some examples, the new DMRS configuration may be used based on a request from the base station or the UE to update a channel estimation model.

Aspects of the disclosure are initially described in the context of wireless communications systems. Additionally, aspects of the disclosure are illustrated through an additional wireless communications system, a flowchart, and a process flow. Aspects of the disclosure are further illustrated by and described with reference to apparatus diagrams, system diagrams, and flowcharts that relate to reference signal design for channel estimation and power amplifier modeling.

FIG. 1 illustrates an example of a wireless communications system 100 that supports reference signal design for channel estimation and power amplifier modeling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may use a DPoD algorithm when communicating with a base station 105 to clear non-linear noise from transmission sent by the base station 105. A DPoD algorithm may be applied at a DPoD receiver at the UE 115. In some cases, the non-linear noise may be generated by a known model due to PA distortion. For example, the base station 105 may apply non-linearity to a channel before transmitting data to the UE 115 (e.g., based on using a PA prior to or when transmitting the data to the UE 115), resulting in distorted signals on the channel. Accordingly, the UE 115 may use the DPoD algorithm to estimate the non-linearity to clear the non-linear errors from signaling on the channel. This clearing of the non-linear errors may improve accurate reception of data transmissions at the UE 115 and effective decoding of the transmission at the UE 115. As described previously, the non-linear noise may be generated based on a PA distortion such that the UE 115 uses the DPoD algorithm to remove non-linear errors generated by a PA used by the base station 105. Accordingly, effectiveness of the DPoD algorithm may be dependent on an accurate estimation of a PA model.

The DPoD algorithm may be applied at a DPoD receiver at a UE 115 to clear non-linear noise that is generated by a known model (e.g. PA distortion). A DPoD receiver operating at the UE 115 may allow power savings at a base station 105. In some examples, the DPoD receiver may work using multiple iterations, where the DPoD receiver performs hard decision slicing for each iteration as part of an iterative process. The DPoD receiver may use sliced symbols in the frequency domain to determine or reconstruct a time domain signal of a transmission as seen before a PA model has been applied or the retransmission has been passed through a non-linear model. The non-linear model may include odd-order memoryless kernels, such as $x \cdot |x|^2$, $x \cdot |x|^4$, etc. In some cases (e.g., for large bandwidths and/or high signal-to-noise ratio (SNR) scenarios), memory kernels, such as $x(n) \cdot |x(n-k)|^M$, may be used, where k represents a delay value and M is an even integer.

In some examples, a base station 105 may apply non-linearity to a channel before transmitting on the channel. For example, the base station 105 may use a PA model or configuration to increase power of a transmitted signal on the channel, but the PA model/configuration may introduce non-linear noise to the transmitted signal, causing the transmitted signal to become distorted. A UE 115 that is intended to receive the transmitted signal may receive this now distorted signal on the channel, such that the UE 115 may need to clear the non-linearity from the channel to properly receive and decode the transmitted signal. In order to clear the non-linearity from the channel, the UE 115 may need an accurate estimation of the channel and the PA non-linearity, thereby allowing the UE 115 to cross-reference the non-linearity with the channel to filter out the distortion. However, reference signals that the UE 115 uses for channel estimation (e.g., a DMRS) may have the non-linearity errors distorting them, hindering capabilities of the UE 115 to accurately estimate the channel to then estimate the non-linearity when the channel is impacted by the non-linearity itself.

Wireless communications system 100 may support efficient techniques to enable a UE 115 to perform both a channel estimation and a non-linearity estimation (e.g., PA model estimation) on a DMRS transmitted by a base station 105, where the channel estimation and non-linearity estimation are used to support the UE 115 receiving subsequent communications from the base station 105. For example, the DMRS may include two portions that correspond to two PAPR values (e.g., a first portion of the DMRS includes a first PAPR and a second portion of the DMRS includes a second PAPR). Low PAPR values may enable the UE 115 to perform the channel estimation, and high PAPR values may enable the UE 115 to perform the PA non-linearity estimation. Accordingly, a first portion of the DMRS may correspond to a lower PAPR value, and the second portion of the DMRS may correspond to a higher PAPR value. In some examples, the base station 105 may signal different parameters (e.g., constellation, roll-off factors, etc.) for each portion of the DMRS to the UE 115, or the UE 115 may use fixed values for each portion of the DMRS (e.g., known or predefined at the UE 115).

Figure 2:
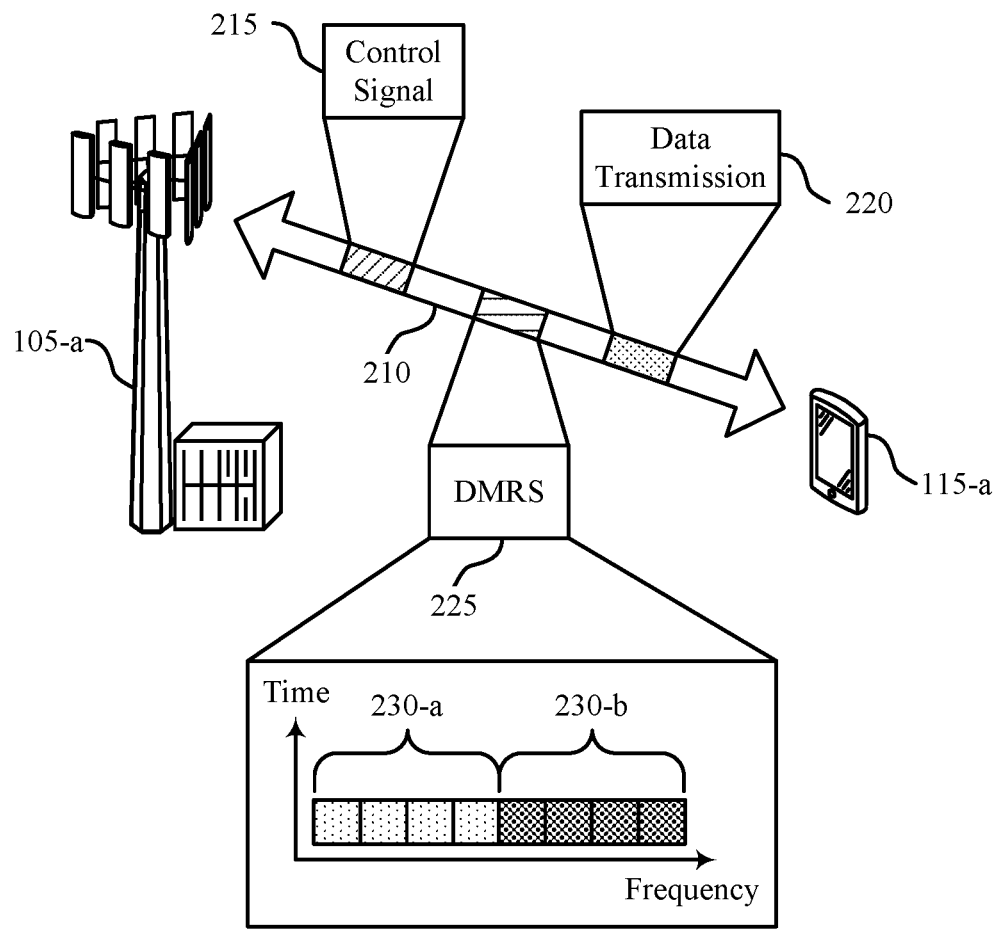
FIG. 2 illustrates an example of a wireless communications system that supports reference signal design for channel estimation and PA modeling in accordance with aspects of the present disclosure.

FIG. 2 illustrates an example of a wireless communications system 200 that supports reference signal design for channel estimation and PA modeling in accordance with aspects of the present disclosure. In some examples, wireless communications system 200 may implement aspects of or may be implemented by aspects of wireless communications system 100. For example, wireless communications system 100 may include a base station 105-a (e.g., a transmitting device) and a UE 115-a (e.g., a receiving device), which may represent examples of corresponding base stations 105 and UEs 115, respectively, as described with reference to FIG. 1. Additionally, the base station 105-a and the UE 115-a may communicate on resources of a carrier 210.

As described herein, the base station 105-a may transmit a specialized reference signal to the UE 115-a, enabling the UE 115-a to perform both a channel estimation and a PA non-linearity estimation using the specialized reference signal. For example, the UE 115-a may detect or receive non-linear noise while attempting to receive a data transmission from the base station 105-a as described with reference to FIG. 1, where this non-linear noise may prevent successful reception of the data transmission and decrease user experience. Accordingly, the UE 115-a may determine a non-linear noise estimation along with a channel estimation using the specialized reference signal to support subsequent data receptions.

For example, the base station 105-a may transmit a DMRS 225 (e.g., specialized reference signal) for a single carrier waveform to enable the UE 115-a to efficiently perform both the channel estimation and the PA non-linearity estimation (e.g., PA model estimation). The base station 105-a may transmit a control signal 215 to the UE 115-a, where the control signal 215 includes configuration information indicating to the UE 115-a that the base station 105-a is to transmit the DMRS 225 to the UE 115-a. The base station 105-a may transmit the DMRS 225 to the UE 115-a based on transmitting the control signal 215 to the UE 115-a. Using the DMRS 225, the UE 115-a may perform both a channel estimation and a PA model estimation. The UE 115-a may then use the channel estimation and PA model estimation in part to clear, decode, and process a data transmission 220 from the base station 105-a.

The DMRS 225 may include multiple portions 230, such as a first portion 230-a and a second portion 230-b. The first portion 230-a may correspond to a first PAPR value, and the second portion 230-b may correspond to a second PAPR value. For example, the first portion 230-a may be based on a low PAPR value, and the second portion 230-b may be based on a high PAPR value. The UE 115-a may perform the channel estimation on the first portion 230-a of the DMRS 225 based on the first portion 230-a corresponding to the low PAPR value. Additionally, the UE 115-a may perform a PA model estimation on the second portion 230-b of the DMRS 225 based on the second portion 230-b corresponding to the high PAPR value.

In some cases, the DMRS 225 may be a known sequence, such as a Zadoff-Chu sequence or a Quadrature Phase Shift Keying (QPSK) sequence, where the signal is based on some bits generated by a maximal length sequence (e.g., a gold sequence). In some examples, using these known sequences may result in a DMRS design with a low PAPR, which may be optimal for minimizing PA distortion impacts but fails to allow the UE 115-a (e.g., a receiving device) to learn a PA non-linearity model that impacts high PAPR data signals. In other examples, if the DMRS 225 is designed to have a high PAPR, accuracy of the channel estimation performed by the UE 115-a may be limited.

Accordingly, as described herein, the DMRS 225 may include the two portions 230 that each correspond to different PAPR values, such that the UE 115-a may perform both a channel estimation and a PA model estimation. The UE 115-a may perform a channel estimation using the first portion 230-a of the DMRS 225 associated with the low PAPR value and may perform a PA model estimation (e.g., non-linearity estimation) using the second portion 230-b of the DMRS 225 associated with the high PAPR value. When performing the PA model estimation, the UE 115-a may use the channel estimation in combination with the high PAPR value of the second portion 230-b of the DMRS 225. The DPoD receiver at the UE 115-b may use the PA model estimation (e.g., and the channel estimation) to process the data transmission 220.

Some DMRS configurations may require an iterative approach for the UE 115-a to perform a PA model estimation (e.g., based on the DPoD algorithm). However, the configuration for the DMRS 225 described herein may allow for a simplified design, where the UE 115-a can perform the PA model estimation with less iterations or no iterations. Additionally or alternatively, by using the DMRS 225 iteratively, the UE 115-a may determine a better initial guess for convergence of an iterative receiver that iteratively estimates the channel and the non-linearity for heavily compressed signals. This iterative process may be further described in more detail with reference to FIG. 3.

When the base station 105-a transmits the DMRS 225 to the UE 115-a, the base station 105-a may send additional frequency information included for the two portions of the DMRS 225 (e.g., the control signal 215 may indicate the frequency resources for the DMRS 225). Additionally, as shown, the DMRS 225 may include four time domain DMRS samples (e.g., four symbols, four TTIs, etc.) belonging to a low PAPR level associated with the first portion 230-a and may include four additional time domain DMRS samples belonging to a high PAPR level associated with the second portion 230-b.

In some cases of single carrier systems, a constellation and a pulse shaping filter used for transmitting and configuring a transmission may determine a PAPR value for that transmission. In some examples, the pulse shaping filter may be a square root raised cosine filter (SRRC) with various roll-offs. In some examples, selecting the filter roll-off may control the signal PAPR. Accordingly, with the two portions 230 of the DMRS 225, the first portion 230-a (e.g., the low PAPR DMRS portion) may utilize a QPSK constellation with high PAPR and a high SRRC roll-off factor. To restrict bandwidth expansion, a lower symbol rate may be used for this part of the signal (e.g., for the first portion 230-a of the DMRS 225). Additionally or alternatively, the second portion 230-b of the DMRS 225 (e.g., the high PAPR DMRS portion) may use a constellation order used by the data transmission 220 and a roll-off of the filter used by the data transmission 220 to ensure a same PAPR is experienced on resources of the second portion 230-b (e.g., on a pilot) and resources of the data transmission 220.

As described previously, PAPR may be determined based on a used constellation for each portion 230 of the DMRS 225 and a pulse shaping filter (e.g., with a particular roll-off value for the filter) used for each portion 230 of the DMRS 225. Additionally, the UE 115-a may determine which portion 230 of the DMRS 225 corresponds to which PAPR level for the respective estimation to perform (e.g., channel estimation, PA model estimation, etc.) based on a roll-off value, constellation, filter, etc. configured or specified for each portion of the DMRS 225. In some examples, the base station 105-a may signal different parameters (e.g., constellation, roll-off factors, etc.) for each portion of the DMRS 225 to the UE 115-a, or the UE 115-a may use fixed values for each portion of the DMRS 225 (e.g., predefined or known to the UE 115-a). Additionally, the base station 105-a may transmit an indication to the UE 115-a to indicate that this DMRS configuration is being used prior to transmitting the DMRS 225 (e.g., via the control signal 215). In some examples, this DMRS configuration may be used based on a request from the base station 105-a or from the UE 115-a to update a channel estimation model.

Figure 3:
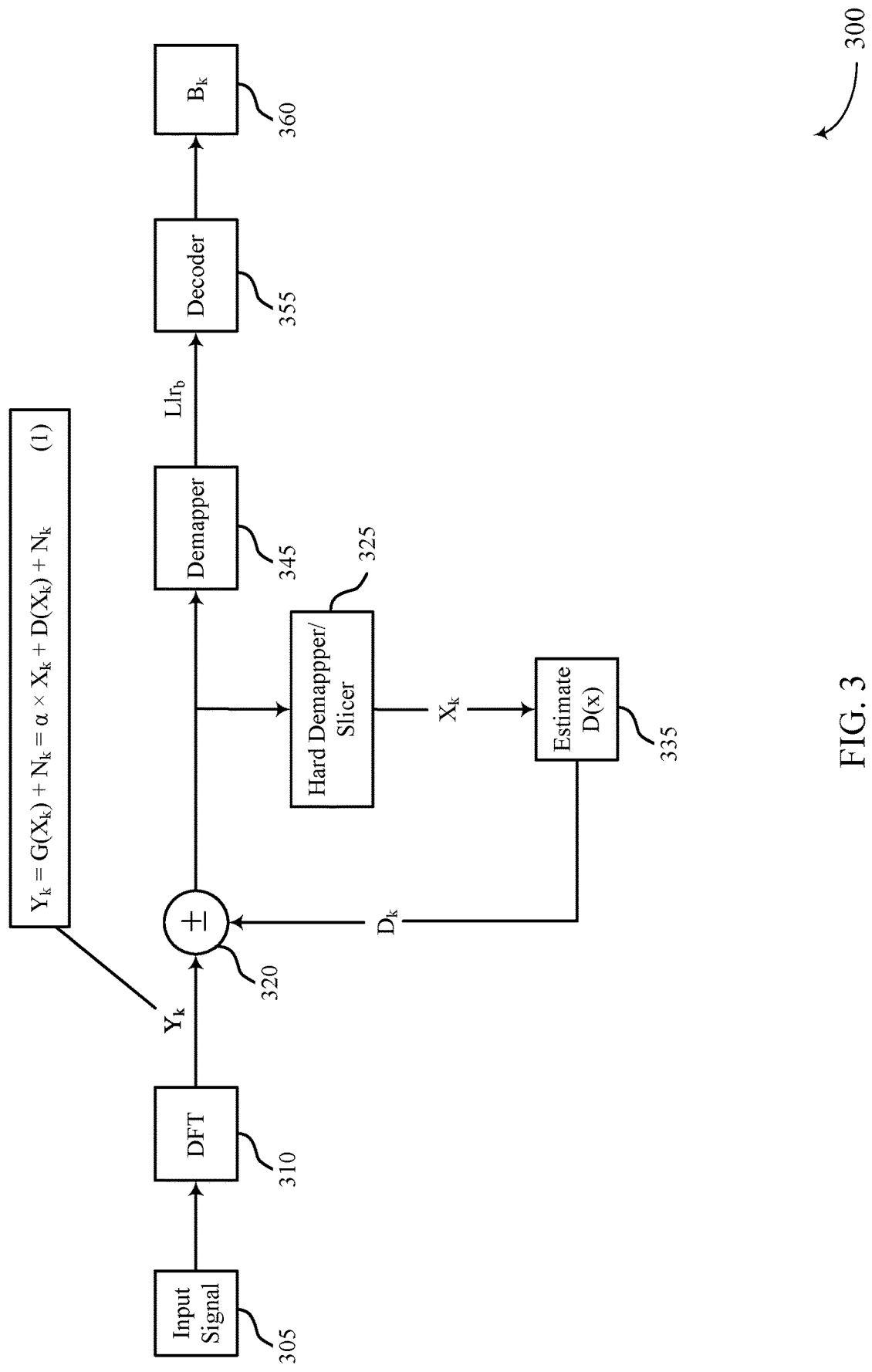
FIG. 3 illustrates an example of a flowchart that supports reference signal design for channel estimation and PA modeling in accordance with aspects of the present disclosure.

FIG. 3 illustrates an example of a flowchart 300 that supports reference signal design for channel estimation and PA modeling in accordance with aspects of the present disclosure. In some examples, flowchart 300 may implement aspects of or may be implemented by aspects of wireless communications system 100, wireless communications system 200, or both. For example, flowchart 300 may represent an iterative system, where a DPoD receiver at a UE 115 performs hard decision slicing in each iteration to determine how distortions affect a message transmitted by a base station 105. In some examples, the DPoD receiver may use sliced symbols in the frequency domain to reconstruct a time domain signal as seen before the message passes though a non-linear PA model (e.g., or other model that introduces non-linearity into the message). Therefore, by utilizing a DPoD receiver at the UE 115, the UE 115 may access the original message despite non-linear distortion on a channel used to communicate the message.

The DPoD process may consist of multiple iterations, in which the DPoD receiver receives hard decision (HD) symbols estimated of transmitted symbols. The DPoD receiver may use HD symbols to reconstruct the data transmission from the base station 105 before the data transmission entered the PA non-linearity model. The DPoD receiver may estimate the non-linearity error based in part on the reconstruction before subtracting the error from the time-domain signal. Upon estimating and removing the non-linear error, the DPoD receiver may revert processing to the frequency domain for further iterations or normal demapping. Therefore, the DPoD correction process may be subsequently dependent on sufficiently accurate estimate of the PA model.

Procedurally, the DPoD correction process may first begin with reception of an input signal 305 (e.g., represented by $y_n$) at the UE 115, where the input signal 305 then enters a discrete Fourier transformation (DFT) 310. During the DFT 310, the input signal 310 may be converted from discrete time samples to discrete frequency samples. Before entering a clearing station 320, the output of the DFT 310 may be given by $Y_k$, where $Y_k$ is further defined by Equation 1.

$$Y_k = G(X_k) + N_K = \alpha \times X_k + D(X_K) + \pm N_K \qquad (1)$$

$X_k$ may represent an output for a hard demapper/slicer 325, $N_K$ may represent additive noise, a may represent the Bussgang coefficient, $G(X_k)$ may represent the power amplifier model such that $G(X_k)$ is the expected PA output for the PA input $X_k$, and $D(X_K)$ may represent an output of an estimation 335 (non linear distortion, represented by the Bussgang decomposition as an additive distortion). At the clearing station 320, the signal is either deemed to be clear from distortion and sent to a demapper 345 or the signal is directed to the hard demapper/slicer 325 for further decoding. If the signal is directed to the hard demapper/slicer 325, the signal enters a process to estimate the signal properties using the estimation 335, where the signal is redirected to the clearing station 320 for reevaluation. In some examples, the operations of using the hard demapper/slicer 325 and performing the estimation 335 may be performed by hardware using the DPoD algorithm (e.g., DPoD hardware).

Once the signal is evaluated and deemed fit for demapping, the signal may be sent to the demapper 345. Alternatively, if the signal is still unfit for demapping, the signal may reenter the hard demapper/slicer 325. After the signal is demapped at 345 to generate an output (e.g., given by $Llr_b$), the signal may travel to a decoder 355, where the DPoD receiver corrects the signal for accurate estimation of the PA model. The decoder 355 prepares a final output signal 360 (e.g., given by $B_k$) to be received and used by the intended UE 115.

The DPoD receiver may use the DPoD correction process as described in FIG. 3 to clear the channel of PA model distortion. The DPoD correction process may occur during the joint estimation process at the UE 115 upon reception of a DMRS that enables the UE 115 to perform both estimations (e.g., the DMRS includes at least two portions for the respective estimations to be performed). Using the DMRS, the UE 115 may use the DPoD correction process as described herein to estimate the PA model distortion as part of the joint estimation process.

Figure 4:
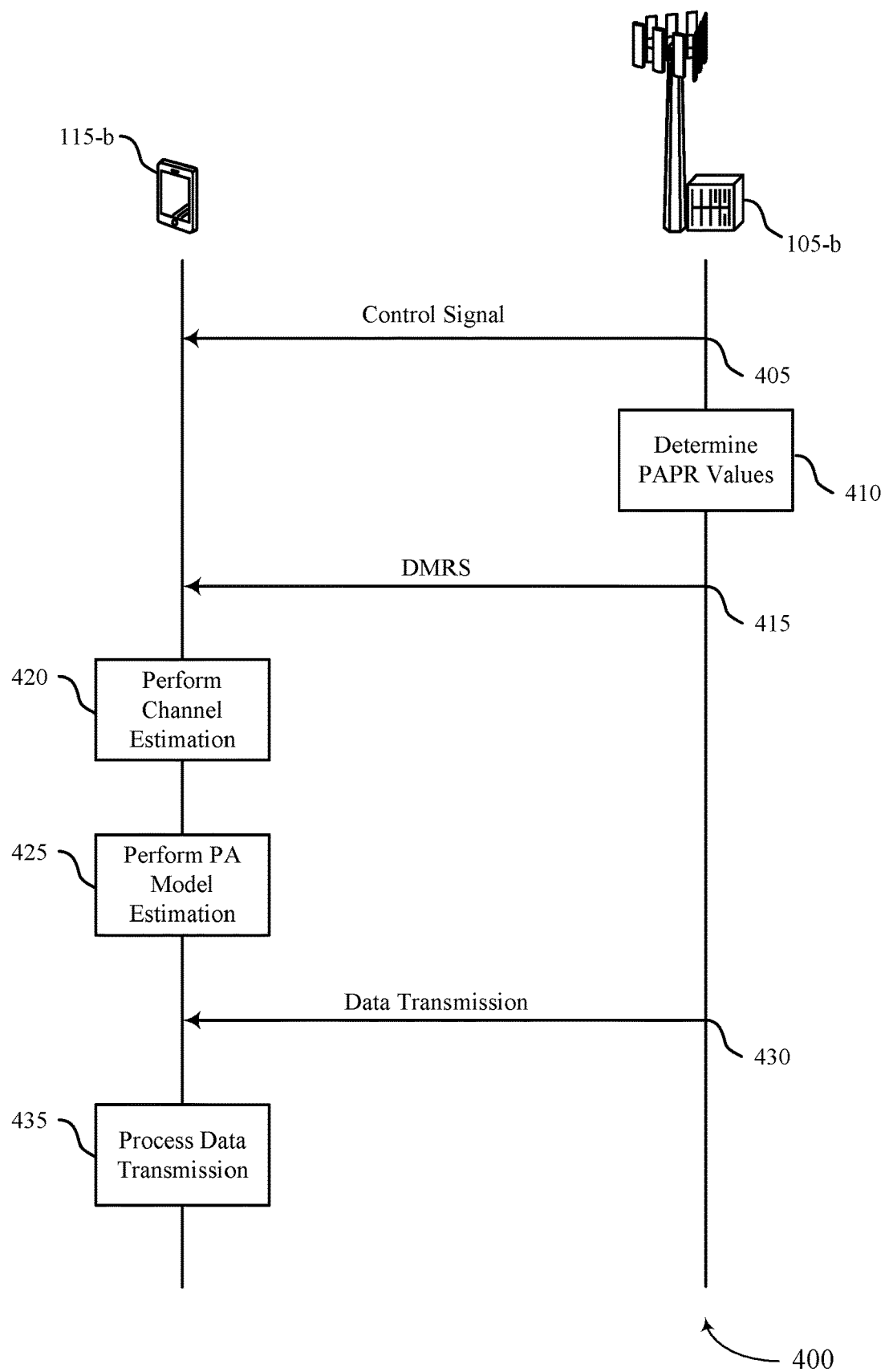
FIG. 4 illustrates an example of a process flow that supports reference signal design for channel estimation and PA modeling in accordance with aspects of the present disclosure.

FIG. 4 illustrates an example of a process flow 400 that supports reference signal design for channel estimation and PA modeling in accordance with aspects of the present disclosure. In some examples, process flow 400 may implement aspects of or may be implemented by aspects of wireless communications system 100, wireless communications system 200, or both. For example, process flow 400 may include a base station 105-b that transmits a specialized reference signal to a UE 115-b, allowing the UE 115-b to perform both a channel estimation and a PA non-linearity estimation (e.g. PA model estimation), where the base station 105-b and the UE 115-b may represent base stations 105 and UEs 115, respectively, as described with reference to FIGS. 1-3.

In the following description of the process flow 400, the operations between the UE 115-b and the base station 105-b may be performed in different orders or at different times. Certain operations may also be left out of the process flow, or other operations may be added to the process flow. While UE 115-b and base station 105-b are shown performing the operations of process flow 400, any wireless communication device may perform the operations shown.

At 405, the base station 105-b may transmit control signaling to the UE 115-b. As part of the control signaling, the base station 105-b may indicate to the UE 115-b that the base station 105-b is planning to transmit a DMRS. For example, the control signaling may indicate to the UE 115-b that the DMRS may include both a first portion and a second portion contained within one signal. In some cases, the first portion of the DMRS may include a low PAPR value to be used in channel estimation by the UE 115-b, and the second portion of the DMRS may include a high PAPR value to be used in PA model estimation by the UE 115-b. The control signaling may include configuration information indicating for the UE 115-b to expect the DMRS transmission from the base station 105-b. The configuration information may include at least partially an indication of the first portion and the second portion contained within the DMRS.

In some cases, the control signaling transmitted from the base station 105-b to the UE 115-b may include a control message detailing multiple transmission parameters (e.g., time and frequency domain resources) for the first portion and the second portion of the DMRS. The UE 115-b may receive the DMRS from the base station 105-b based at least partially on the transmission parameters contained within the control signaling. Similarly, the base station 105-b may transmit the DMRS to the UE 115-b based at least partially on the transmission parameters contained within the control signaling. The transmission parameters may include a roll-off factor for the first portion and the second portion of the DMRS, a constellation used for the first portion and the second portion of the DMRS, or a combination thereof.

At 410, the base station 105-b may determine PAPR values used in generating the DMRS. This PAPR determination may include determining a first PAPR for the first portion of the DMRS and a second PAPR for the second portion of the DMRS. The base station 105-b may determine a low PAPR for the first portion and a high PAPR for the second portion. The UE 115-b may use the first PAPR for channel estimation and the second PAPR for PA model estimation.

In some cases, determining the PAPR values may include determining transmission parameters at the base station 105-b. When determining the first PAPR, the base station 105-b may determine a first roll-off factor and a first constellation for the first portion of the DMRS, where the first PAPR is at least partially based on the first roll-off factor and the first constellation. In some examples, the first roll-off factor may be used for a first shaping filter applied to the first portion of the DMRS. When determining the second PAPR, the base station 105-b may determine a second roll-off factor and a second constellation for the second portion of the DMRS, where the second PAPR is at least partially based on the second roll-off factor and the second constellation. In some examples, the second roll-off factor may be used for a second shaping filter applied to the second portion of the DMRS. In some implementations, the first shaping filter and the second shaping filter may be the same pulse shaping filter or different pulse shaping filters.

In some implementations, due to the second portion of the DMRS being devoted to the estimation of the PA model, the transmission parameters for the second portion may be the same that are used for data transmissions to the UE 115-b. The second roll-off factor and the second constellation for the second portion of the DMRS may be the same roll-off factor and the same constellation order used for the data transmission.

At 415, the base station 105-*b* may transmit the DMRS to the UE 115-*b*. The DMRS may include the first portion and the second portion in accordance with the control signaling, as detailed at 405. Similarly, the first portion may correspond to a first PAPR value with a first roll-off factor and the second portion may correspond to a second PAPR value with a second roll-off factor. In some cases, UE 115-*b* may receive the first portion and the second portion based on fixed transmission parameter values for the first portion and the second portion. In some examples, the fixed transmission parameter values may be identified based at least partially on receiving the control signaling or may be predefined or known to the UE 115-*b*.

In some cases, the UE 115-*b* may receive the DMRS in two parts, where the first portion of the DMRS is received on a first set of time-domain resources of the DMRS and the second portion of the DMRS is received on a second set of time-domain resources of the DMRS. In some cases, the DMRS may include the first portion and the second portion as a single carrier waveform.

At 420, the UE 115-*b* may perform a channel estimation based on the first portion of the DMRS (e.g., the portion with a low PAPR value). At 425, the UE 115-*b* may perform a PA model estimation based on the second portion of the DMRS (e.g., the portion with a high PAPR value). For example, the first portion of the DMRS may include a first PAPR for performing the channel estimation, and the second portion of the DMRS may include a second PAPR for performing the PA model estimation, where the second PAPR is higher than the first PAPR. The UE 115-*b* may perform the PA model estimation to eliminate non-linear errors. The PA model estimation may include a PA non-linearity model estimation used to estimate a non-linearity error for a DPoD algorithm. Using the estimation of the non-linearity error, the UE 115-*b* may perform a DPoD correction process to clear the channel from error.

At 430, the base station 105-*b* may send a data transmission to the UE 115-*b*. The data transmission may be on the same channel or different channel as the DMRS. At 435, the data transmission may be decoded and processed by the UE 115-*b* based on the channel estimation and the PA model estimation. In some cases, the UE 115-*b* may transmit a request to update a channel estimation model to the base station 105-*b*, where the UE 115-*b* receives the control signaling indicating the multi-portion DMRS configuration based on transmitting the request to the base station 105-*b*. Additionally or alternatively, the UE 115-*b* may receive a request to update the channel estimation model from the base station 105-*b*, where the UE 115-*b* receives the control signaling indicating the multi-portion DMRS based on receiving the request form the base station 105-*b*.

Figure 5:
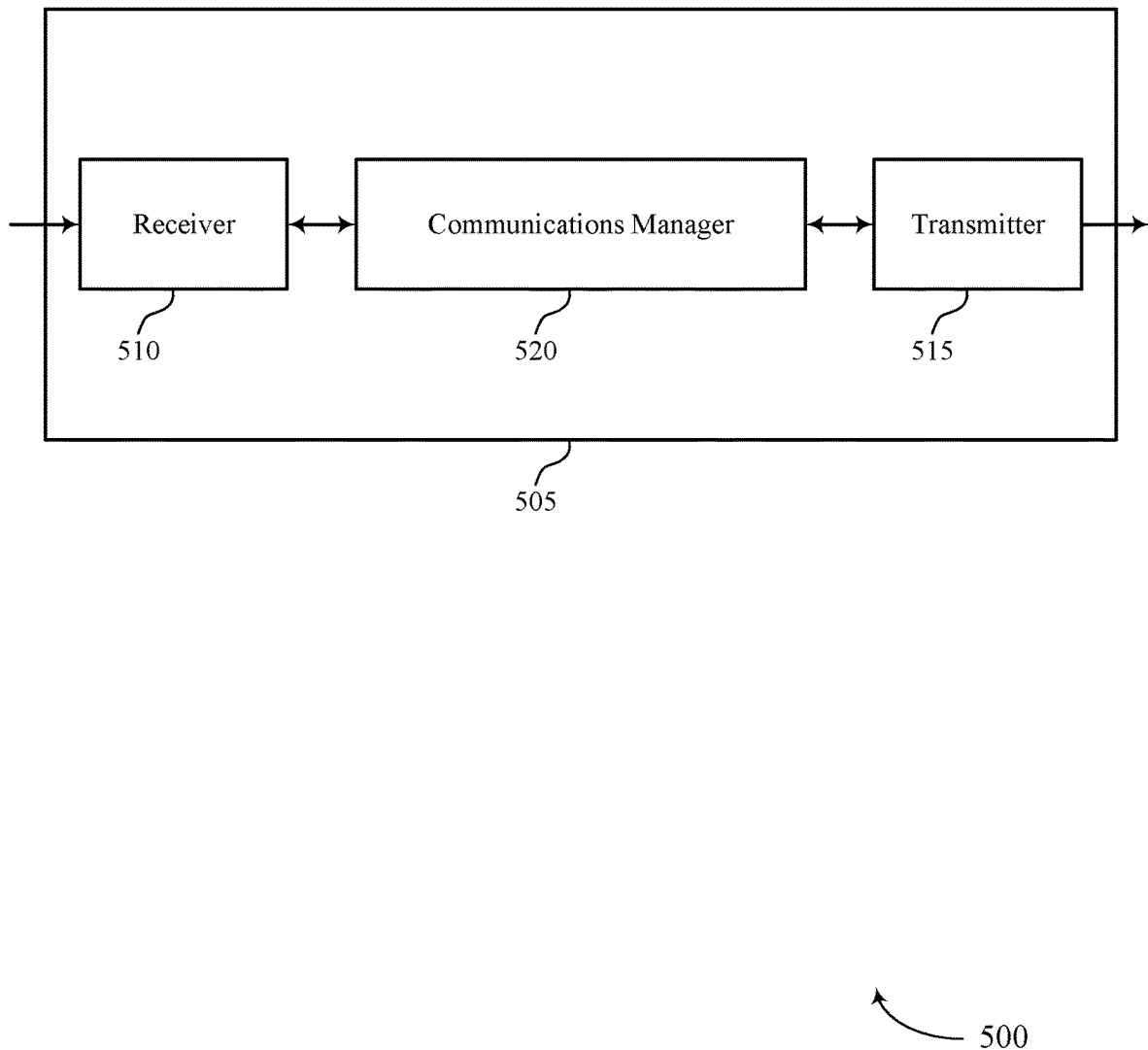
FIGS. 5 and 6 show block diagrams of devices that support reference signal design for channel estimation and PA modeling in accordance with aspects of the present disclosure.

FIG. 5 shows a block diagram 500 of a device 505 that supports reference signal design for channel estimation and PA modeling in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to reference signal design for channel estimation and PA modeling). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to reference signal design for channel estimation and PA modeling). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of reference signal design for channel estimation and PA modeling as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving, from a base station, control signaling indicating the base station is to transmit a DMRS including a first portion and a second portion. The communications manager 520 may be configured as or otherwise support a means for receiving, from the base station, the DMRS including the first portion and the second portion in accordance with the control signaling, the first portion corresponding to a first roll-off factor and the second portion corresponding to a second roll-off factor. The communications manager 520 may be configured as or otherwise support a means for performing a channel estimation on the first portion of the DMRS based on the first roll-off factor. The communications manager 520 may be configured as or otherwise support a means for performing a PA model estimation on the second portion of the DMRS based on the second roll-off factor and the channel estimation. The communications manager 520 may be configured as or otherwise support a means for processing a data transmission received from the base station in accordance with the channel estimation and the PA model estimation.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced power consumption and more efficient utilization of communication resources.

Figure 6:
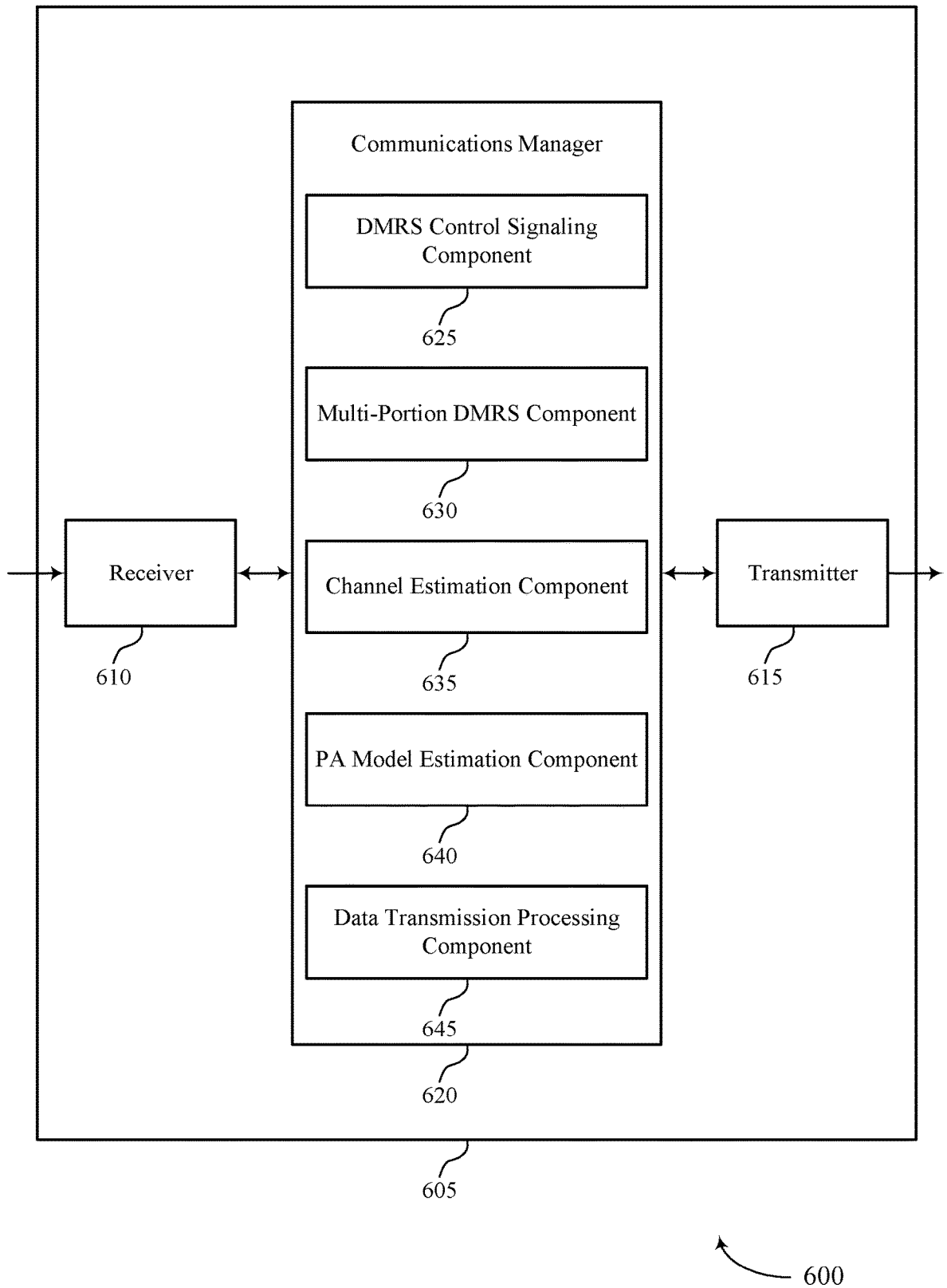

FIG. 6 shows a block diagram 600 of a device 605 that supports reference signal design for channel estimation and PA modeling in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to reference signal design for channel estimation and PA modeling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to reference signal design for channel estimation and PA modeling). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of reference signal design for channel estimation and PA modeling as described herein. For example, the communications manager 620 may include a DMRS control signaling component 625, a multi-portion DMRS component 630, a channel estimation component 635, a PA model estimation component 640, a data transmission processing component 645, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The DMRS control signaling component 625 may be configured as or otherwise support a means for receiving, from a base station, control signaling indicating the base station is to transmit a DMRS including a first portion and a second portion. The multi-portion DMRS component 630 may be configured as or otherwise support a means for receiving, from the base station, the DMRS including the first portion and the second portion in accordance with the control signaling, the first portion corresponding to a first roll-off factor and the second portion corresponding to a second roll-off factor. The channel estimation component 635 may be configured as or otherwise support a means for performing a channel estimation on the first portion of the DMRS based on the first roll-off factor. The PA model estimation component 640 may be configured as or otherwise support a means for performing a PA model estimation on the second portion of the DMRS based on the second roll-off factor and the channel estimation. The data transmission processing component 645 may be configured as or otherwise support a means for processing a data transmission received from the base station in accordance with the channel estimation and the PA model estimation.

Figure 7:
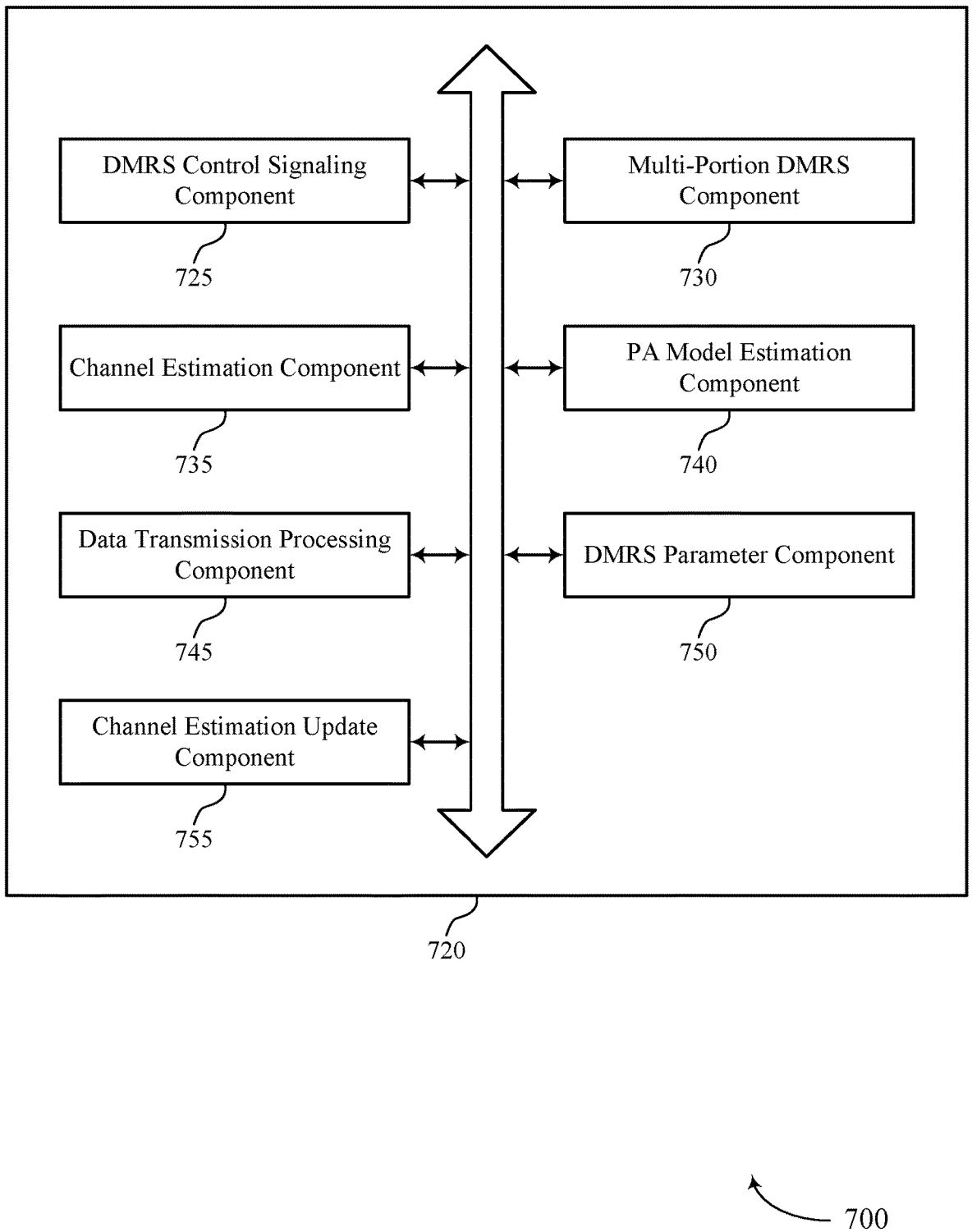
FIG. 7 shows a block diagram of a communications manager that supports reference signal design for channel estimation and PA modeling in accordance with aspects of the present disclosure.

FIG. 7 shows a block diagram 700 of a communications manager 720 that supports reference signal design for channel estimation and PA modeling in accordance with aspects of the present disclosure. The communications manager 720 may be an example of aspects of a communications manager 520, a communications manager 620, or both, as described herein. The communications manager 720, or various components thereof, may be an example of means for performing various aspects of reference signal design for channel estimation and PA modeling as described herein. For example, the communications manager 720 may include a DMRS control signaling component 725, a multi-portion DMRS component 730, a channel estimation component 735, a PA model estimation component 740, a data transmission processing component 745, a DMRS parameter component 750, a channel estimation update component 755, or any combination thereof. Each of these components may communicate, directly or indirectly, with one another (e.g., via one or more buses).

The communications manager 720 may support wireless communications at a UE in accordance with examples as disclosed herein. The DMRS control signaling component 725 may be configured as or otherwise support a means for receiving, from a base station, control signaling indicating the base station is to transmit a DMRS including a first portion and a second portion. The multi-portion DMRS component 730 may be configured as or otherwise support a means for receiving, from the base station, the DMRS including the first portion and the second portion in accordance with the control signaling, the first portion corresponding to a first roll-off factor and the second portion corresponding to a second roll-off factor. The channel estimation component 735 may be configured as or otherwise support a means for performing a channel estimation on the first portion of the DMRS based on the first roll-off factor. The PA model estimation component 740 may be configured as or otherwise support a means for performing a PA model estimation on the second portion of the DMRS based on the second roll-off factor and the channel estimation. The data transmission processing component 745 may be configured as or otherwise support a means for processing a data transmission received from the base station in accordance with the channel estimation and the PA model estimation.

In some examples, the DMRS parameter component 750 may be configured as or otherwise support a means for receiving, from the base station, a control message including a set of multiple transmission parameters for each portion of the DMRS, where the DMRS is received based on the set of multiple transmission parameters. In some examples, the set of multiple transmission parameters may include a roll-off factor for each portion of the DMRS, a constellation used for each portion of the DMRS, or a combination thereof. In some examples, the first portion of the DMRS may include a first PAPR for performing the channel estimation, and the second portion of the DMRS may include a second PAPR for performing the PA model estimation, where the second PAPR is higher than the first PAPR.

In some examples, to support receiving the DMRS, the DMRS parameter component 750 may be configured as or otherwise support a means for receiving each portion of the DMRS based on fixed transmission parameter values for the first portion and the second portion, where the fixed transmission parameter values for the first portion and the second portion are identified based on receiving the control signaling.

In some examples, the channel estimation update component 755 may be configured as or otherwise support a means for transmitting, to the base station, a request to update a channel estimation model, where the control signaling is received based on transmitting the request. Additionally or alternatively, the channel estimation update component 755 may be configured as or otherwise support a means for receiving, from the base station, a request to update a channel estimation model, where the control signaling is received based on receiving the request.

In some examples, to support receiving the DMRS including the first portion and the second portion, the multi-portion DMRS component 730 may be configured as or otherwise support a means for receiving the first portion of the DMRS on a first set of time-domain resources of the DMRS. Additionally, to support receiving the DMRS including the first portion and the second portion, the multi-portion DMRS component 730 may be configured as or otherwise support a means for receiving the second portion of the DMRS on a second set of time-domain resources of the DMRS.

In some examples, the first roll-off factor may be used for a first shaping filter applied to the first portion of the DMRS, and the second roll-off factor may be used for a second shaping filter applied to the second portion of the DMRS, where the first shaping filter and the second shaping filter are a same pulse shaping filter or different pulse shaping filters. In some examples, the second roll-off factor and a constellation order used for the second portion of the DMRS may be a same roll-off factor and a same constellation order used for the data transmission. In some examples, the PA model estimation may include a PA non-linearity model estimation used to estimate a non-linearity error for a DPoD algorithm.

In some examples, the DMRS including the two portions may include a single carrier waveform.

Figure 8:
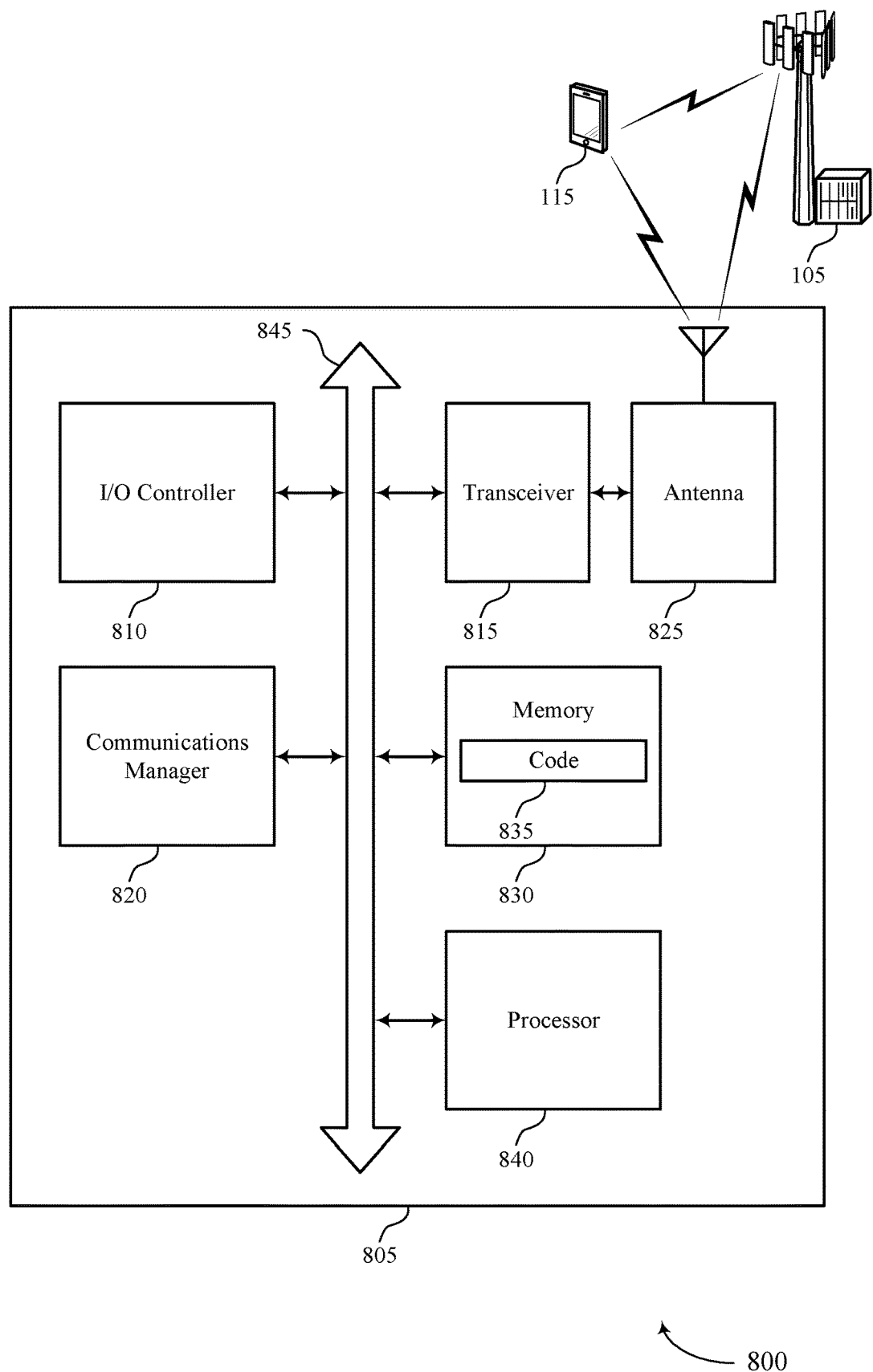
FIG. 8 shows a diagram of a system including a device that supports reference signal design for channel estimation and PA modeling in accordance with aspects of the present disclosure.

FIG. 8 shows a diagram of a system 800 including a device 805 that supports reference signal design for channel estimation and PA modeling in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting reference signal design for channel estimation and PA modeling). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving, from a base station, control signaling indicating the base station is to transmit a DMRS including a first portion and a second portion. The communications manager 820 may be configured as or otherwise support a means for receiving, from the base station, the DMRS including the first portion and the second portion in accordance with the control signaling, the first portion corresponding to a first roll-off factor and the second portion corresponding to a second roll-off factor. The communications manager 820 may be configured as or otherwise support a means for performing a channel estimation on the first portion of the DMRS based on the first roll-off factor. The communications manager 820 may be configured as or otherwise support a means for performing a PA model estimation on the second portion of the DMRS based on the second roll-off factor and the channel estimation. The communications manager 820 may be configured as or otherwise support a means for processing a data transmission received from the base station in accordance with the channel estimation and the PA model estimation.

By including or configuring the communications manager 820 in accordance with examples as described herein, the device 805 may support techniques for improved communication reliability, more efficient utilization of communication resources, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of reference signal design for channel estimation and PA modeling as described herein, or the processor 840 and the memory 830 may be otherwise configured to perform or support such operations.

Figure 9:
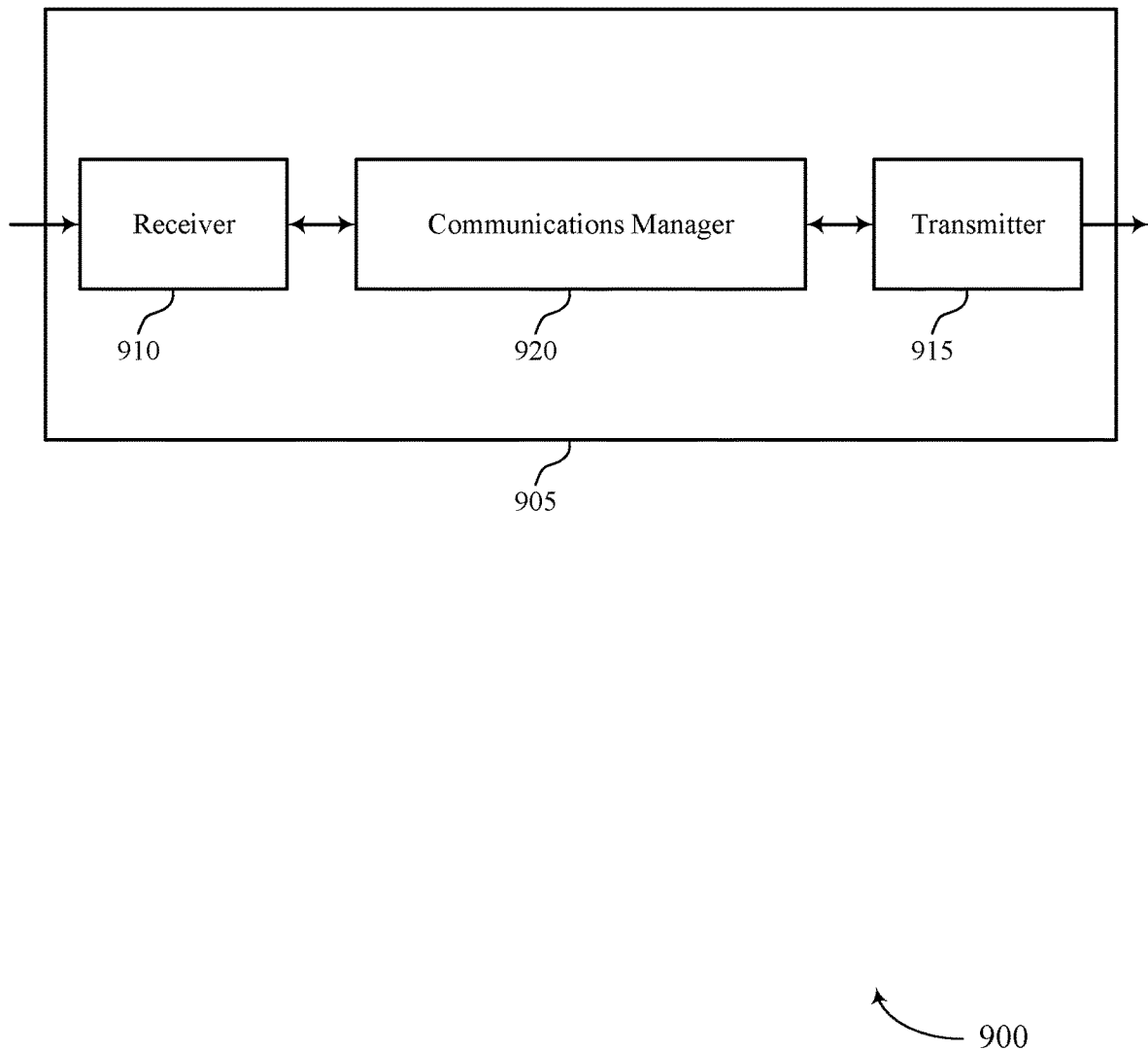
FIGS. 9 and 10 show block diagrams of devices that support reference signal design for channel estimation and PA modeling in accordance with aspects of the present disclosure.

FIG. 9 shows a block diagram 900 of a device 905 that supports reference signal design for channel estimation and PA modeling in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to reference signal design for channel estimation and PA modeling). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to reference signal design for channel estimation and PA modeling). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of reference signal design for channel estimation and PA modeling as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting, to a UE, control signaling indicating the base station is to transmit a DMRS including a first portion and a second portion. The communications manager 920 may be configured as or otherwise support a means for determining a first PAPR for the first portion of the DMRS and a second PAPR for the second portion of the DMRS. The communications manager 920 may be configured as or otherwise support a means for transmitting, to the UE, the DMRS including the first portion and the second portion in accordance with the control signaling, the first portion including the first PAPR and the second portion including the second PAPR. The communications manager 920 may be configured as or otherwise support a means for transmitting, to the UE, a data transmission in accordance with a channel estimation corresponding to the first portion and a PA model estimation corresponding to the second portion and the channel estimation.

Figure 10:
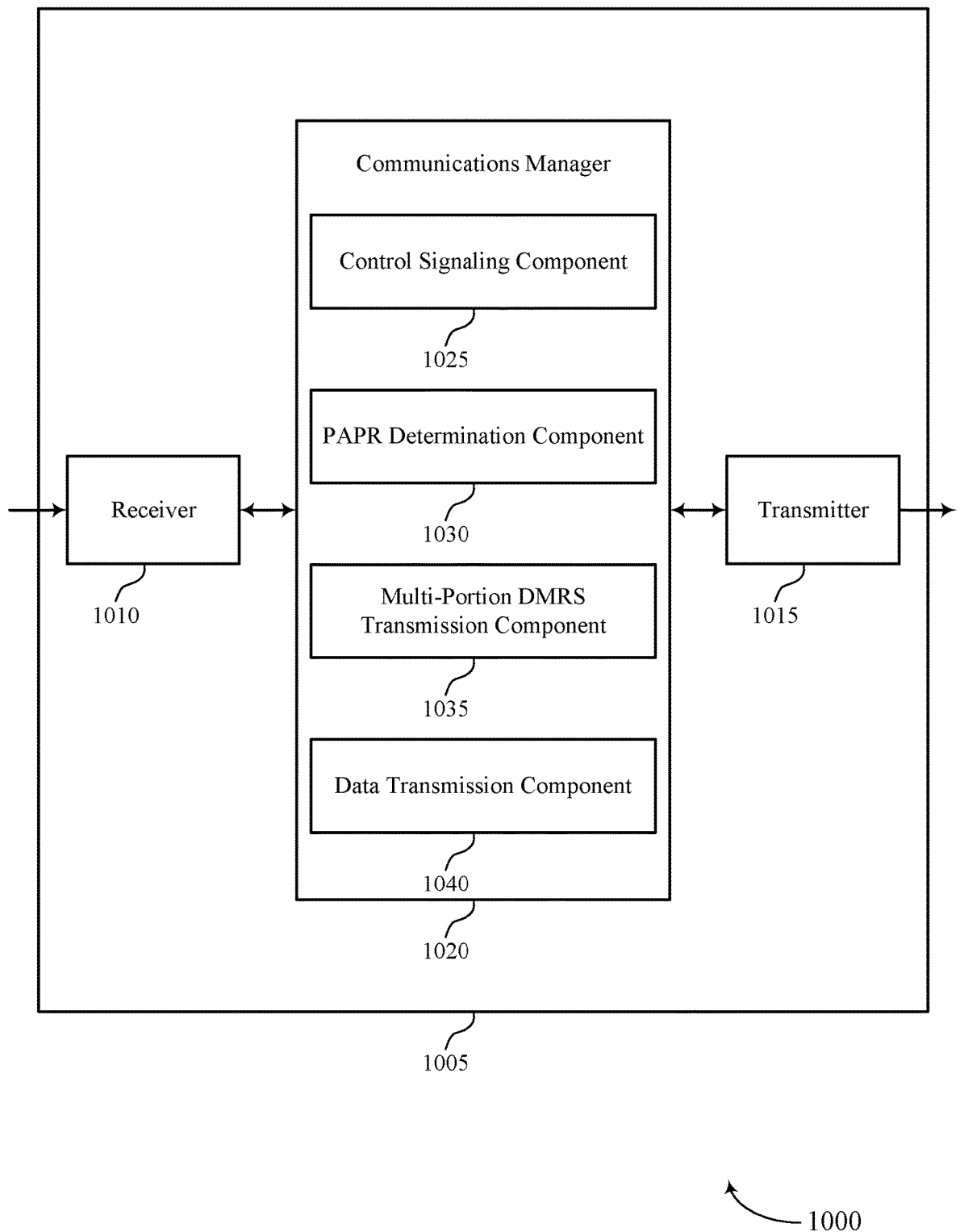

FIG. 10 shows a block diagram 1000 of a device 1005 that supports reference signal design for channel estimation and PA modeling in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to reference signal design for channel estimation and PA modeling). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to reference signal design for channel estimation and PA modeling). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of reference signal design for channel estimation and PA modeling as described herein. For example, the communications manager 1020 may include a control signaling component 1025, a PAPR determination component 1030, a multi-portion DMRS transmission component 1035, a data transmission component 1040, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The control signaling component 1025 may be configured as or otherwise support a means for transmitting, to a UE, control signaling indicating the base station is to transmit a DMRS including a first portion and a second portion. The PAPR determination component 1030 may be configured as or otherwise support a means for determining a first PAPR for the first portion of the DMRS and a second PAPR for the second portion of the DMRS. The multi-portion DMRS transmission component 1035 may be configured as or otherwise support a means for transmitting, to the UE, the DMRS including the first portion and the second portion in accordance with the control signaling, the first portion including the first PAPR and the second portion including the second PAPR. The data transmission component 1040 may be configured as or otherwise support a means for transmitting, to the UE, a data transmission in accordance with a channel estimation corresponding to the first portion and a PA model estimation corresponding to the second portion and the channel estimation.

Figure 11:
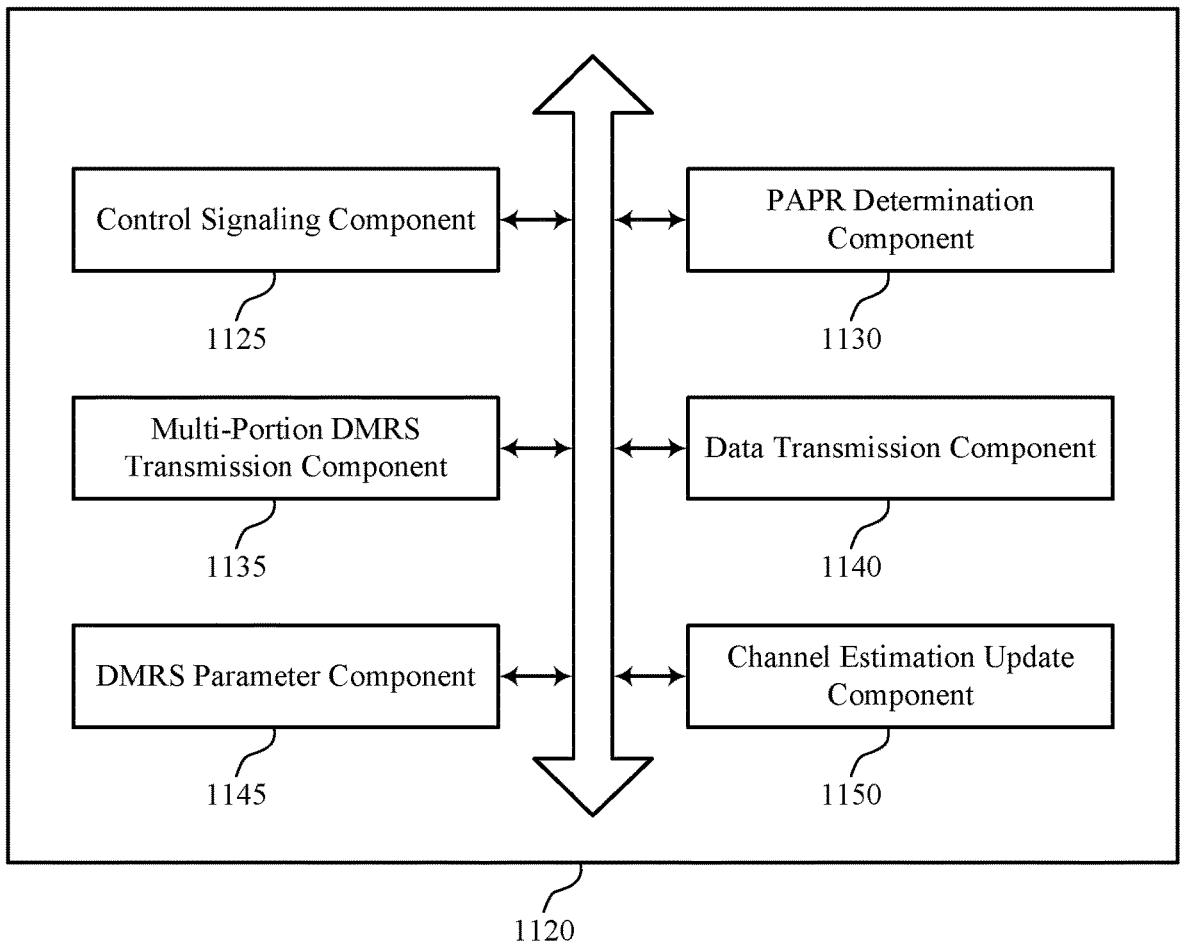
FIG. 11 shows a block diagram of a communications manager that supports reference signal design for channel estimation and PA modeling in accordance with aspects of the present disclosure.

FIG. 11 shows a block diagram 1100 of a communications manager 1120 that supports reference signal design for channel estimation and PA modeling in accordance with aspects of the present disclosure. The communications manager 1120 may be an example of aspects of a communications manager 920, a communications manager 1020, or both, as described herein. The communications manager 1120, or various components thereof, may be an example of means for performing various aspects of reference signal design for channel estimation and PA modeling as described herein. For example, the communications manager 1120 may include a control signaling component 1125, a PAPR determination component 1130, a multi-portion DMRS transmission component 1135, a data transmission component 1140, a DMRS parameter component 1145, a channel estimation update component 1150, or any combination thereof. Each of these components may communicate, directly or indirectly, with one another (e.g., via one or more buses).

The communications manager 1120 may support wireless communications at a base station in accordance with examples as disclosed herein. The control signaling component 1125 may be configured as or otherwise support a means for transmitting, to a UE, control signaling indicating the base station is to transmit a DMRS including a first portion and a second portion. The PAPR determination component 1130 may be configured as or otherwise support a means for determining a first PAPR for the first portion of the DMRS and a second PAPR for the second portion of the DMRS. The multi-portion DMRS transmission component 1135 may be configured as or otherwise support a means for transmitting, to the UE, the DMRS including the first portion and the second portion in accordance with the control signaling, the first portion including the first PAPR and the second portion including the second PAPR. The data transmission component 1140 may be configured as or otherwise support a means for transmitting, to the UE, a data transmission in accordance with a channel estimation corresponding to the first portion and a PA model estimation corresponding to the second portion and the channel estimation.

In some examples, the DMRS parameter component 1145 may be configured as or otherwise support a means for transmitting, to the UE, a control message including a set of multiple transmission parameters for each portion of the DMRS, where the DMRS is transmitted based on the set of multiple transmission parameters. In some examples, the set of multiple transmission parameters may include a roll-off factor for each portion of the DMRS, a constellation used for each portion of the DMRS, or a combination thereof. Additionally or alternatively, to support transmitting the DMRS, the DMRS parameter component 1145 may be configured as or otherwise support a means for transmitting each portion of the DMRS based on fixed transmission parameter values for the first portion and the second portion.

In some examples, the channel estimation update component 1150 may be configured as or otherwise support a means for receiving, from the UE, a request to update a channel estimation model, where the control signaling is transmitted based on receiving the request. Additionally or alternatively, the channel estimation update component 1150 may be configured as or otherwise support a means for transmitting, to the UE, a request to update a channel estimation model, where the control signaling is transmitted based on transmitting the request.

In some examples, to support determining the first PAPR and the second PAPR, the PAPR determination component 1130 may be configured as or otherwise support a means for determining a first roll-off factor and a first constellation for the first portion of the DMRS, where the first PAPR is determined based on the first roll-off factor and the first constellation. In some examples, to support determining the first PAPR and the second PAPR, the PAPR determination component 1130 may be configured as or otherwise support a means for determining a second roll-off factor and a second constellation for the second portion of the DMRS, where the second PAPR is determined based on the second roll-off factor and the second constellation.

In some examples, the first roll-off factor may be used for a first shaping filter applied to the first portion of the DMRS, and the second roll-off factor may be used for a second shaping filter applied to the second portion of the DMRS, where the first shaping filter and the second shaping filter are a same pulse shaping filter or different pulse shaping filters. In some examples, the second roll-off factor and the second constellation for the second portion of the DMRS are a same roll-off factor and a same constellation order used for the data transmission.

In some examples, to support transmitting the DMRS including the first portion and the second portion, the multi-portion DMRS transmission component 1135 may be configured as or otherwise support a means for transmitting the first portion of the DMRS on a first set of time-domain resources of the DMRS. Additionally, to support transmitting the DMRS including the first portion and the second portion, the multi-portion DMRS transmission component 1135 may be configured as or otherwise support a means for transmitting the second portion of the DMRS on a second set of time-domain resources of the DMRS.

In some examples, the PA model estimation may include a PA non-linearity model estimation used to estimate a non-linearity error for a DPoD algorithm. In some examples, the DMRS including the two portions may include a single carrier waveform.

Figure 12:
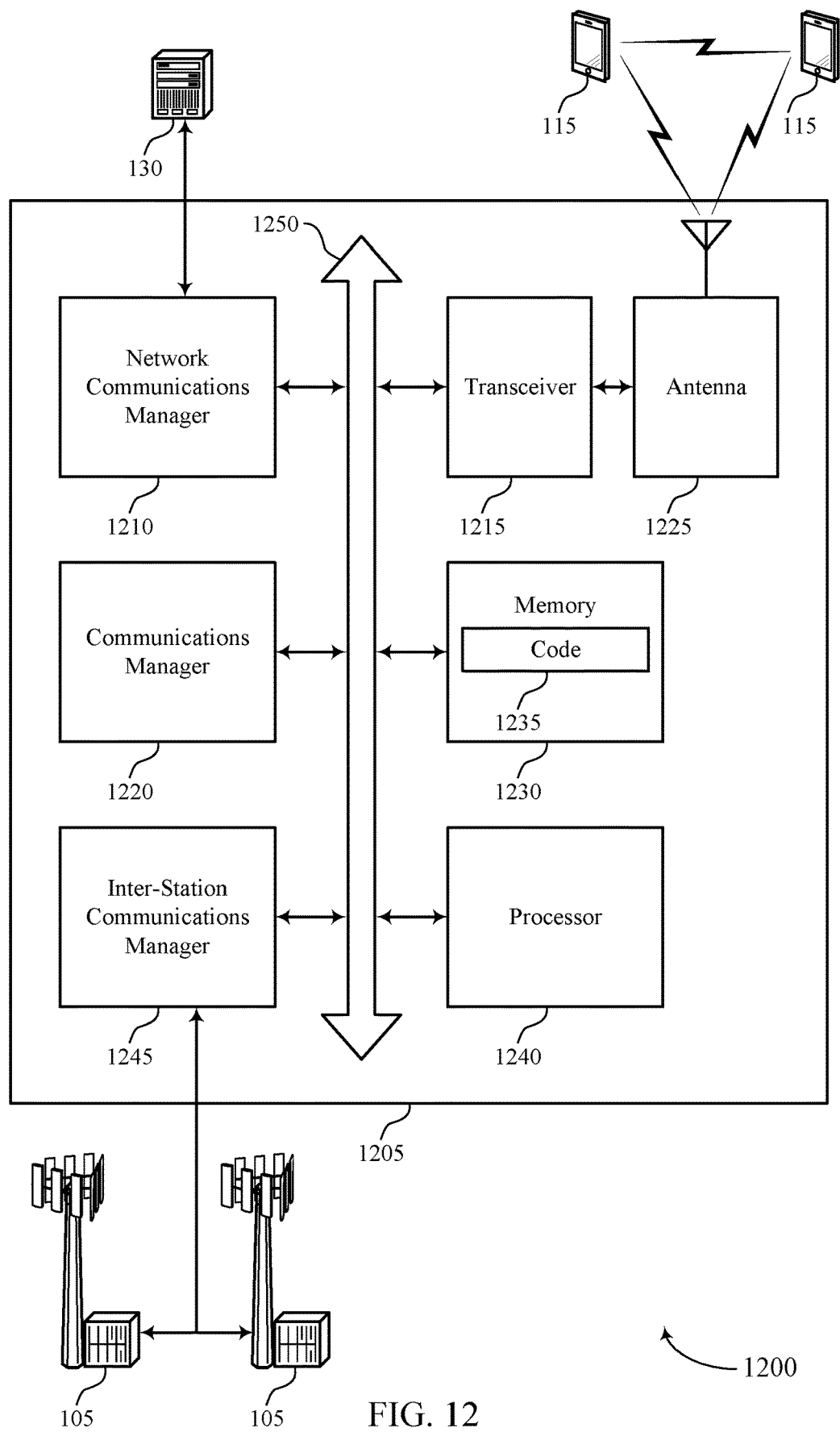
FIG. 12 shows a diagram of a system including a device that supports reference signal design for channel estimation and PA modeling in accordance with aspects of the present disclosure.

FIG. 12 shows a diagram of a system 1200 including a device 1205 that supports reference signal design for channel estimation and PA modeling in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting reference signal design for channel estimation and PA modeling). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting, to a UE, control signaling indicating the base station is to transmit a DMRS including a first portion and a second portion. The communications manager 1220 may be configured as or otherwise support a means for determining a first PAPR for the first portion of the DMRS and a second PAPR for the second portion of the DMRS. The communications manager 1220 may be configured as or otherwise support a means for transmitting, to the UE, the DMRS including the first portion and the second portion in accordance with the control signaling, the first portion including the first PAPR and the second portion including the second PAPR. The communications manager 1220 may be configured as or otherwise support a means for transmitting, to the UE, a data transmission in accordance with a channel estimation corresponding to the first portion and a PA model estimation corresponding to the second portion and the channel estimation.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of reference signal design for channel estimation and PA modeling as described herein, or the processor 1240 and the memory 1230 may be otherwise configured to perform or support such operations.

Figure 13:
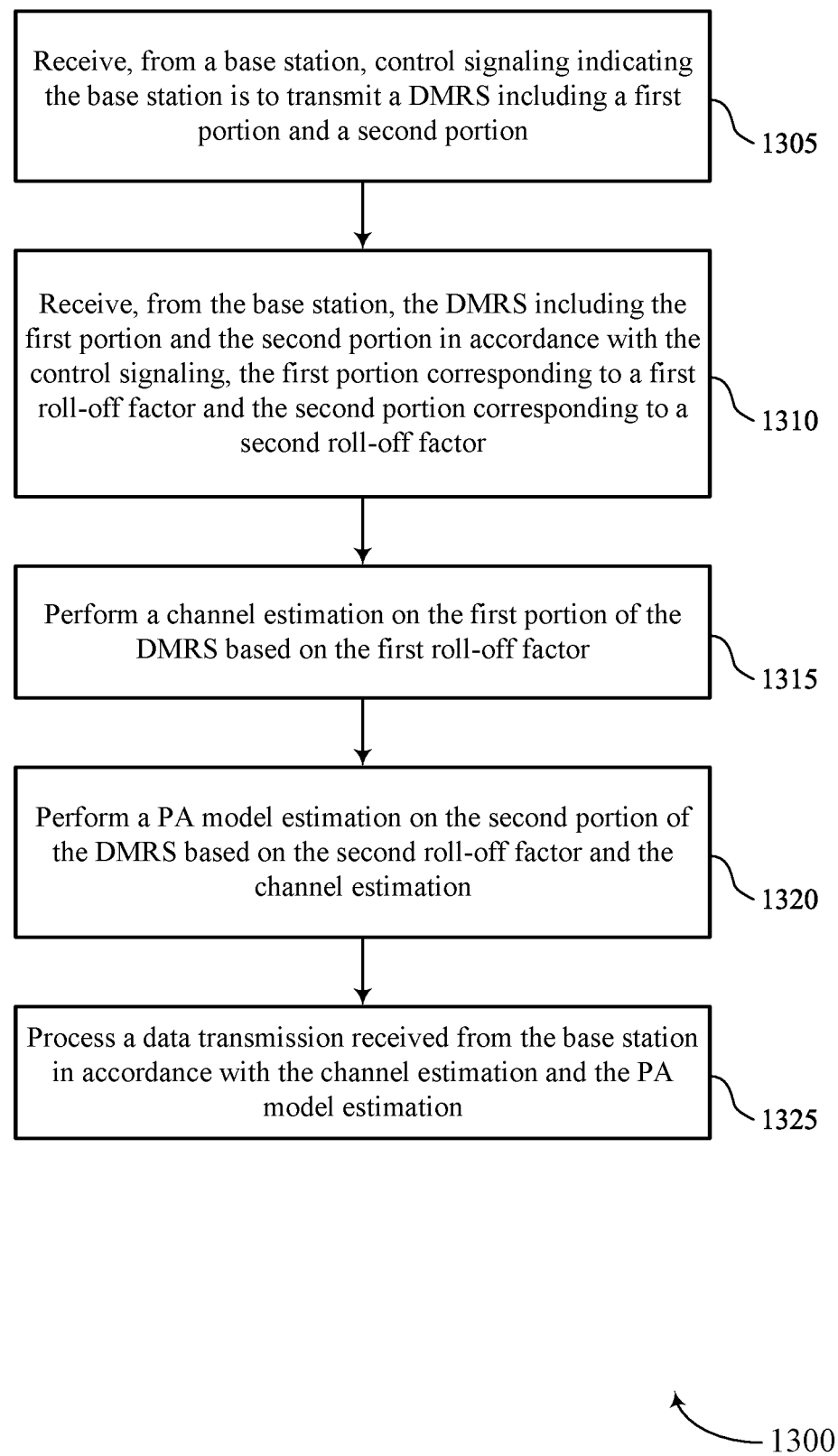
FIGS. 13 through 18 show flowcharts illustrating methods that support reference signal design for channel estimation and PA modeling in accordance with aspects of the present disclosure.

FIG. 13 shows a flowchart illustrating a method 1300 that supports reference signal design for channel estimation and PA modeling in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, control signaling indicating the base station is to transmit a DMRS including a first portion and a second portion. The operations of 1305 may be performed in accordance with examples as disclosed herein. In some examples, aspects of the operations of 1305 may be performed by a DMRS control signaling component 725 as described with reference to FIG. 7.

At 1310, the method may include receiving, from the base station, the DMRS including the first portion and the second portion in accordance with the control signaling, the first portion corresponding to a first roll-off factor and the second portion corresponding to a second roll-off factor. The operations of 1310 may be performed in accordance with examples as disclosed herein. In some examples, aspects of the operations of 1310 may be performed by a multi-portion DMRS component 730 as described with reference to FIG. 7.

At 1315, the method may include performing a channel estimation on the first portion of the DMRS based on the first roll-off factor. The operations of 1315 may be performed in accordance with examples as disclosed herein. In some examples, aspects of the operations of 1315 may be performed by a channel estimation component 735 as described with reference to FIG. 7.

At 1320, the method may include performing a PA model estimation on the second portion of the DMRS based on the second roll-off factor and the channel estimation. The operations of 1320 may be performed in accordance with examples as disclosed herein. In some examples, aspects of the operations of 1320 may be performed by a PA model estimation component 740 as described with reference to FIG. 7.

At 1325, the method may include processing a data transmission received from the base station in accordance with the channel estimation and the PA model estimation. The operations of 1325 may be performed in accordance with examples as disclosed herein. In some examples, aspects of the operations of 1325 may be performed by a data transmission processing component 745 as described with reference to FIG. 7.

Figure 14:
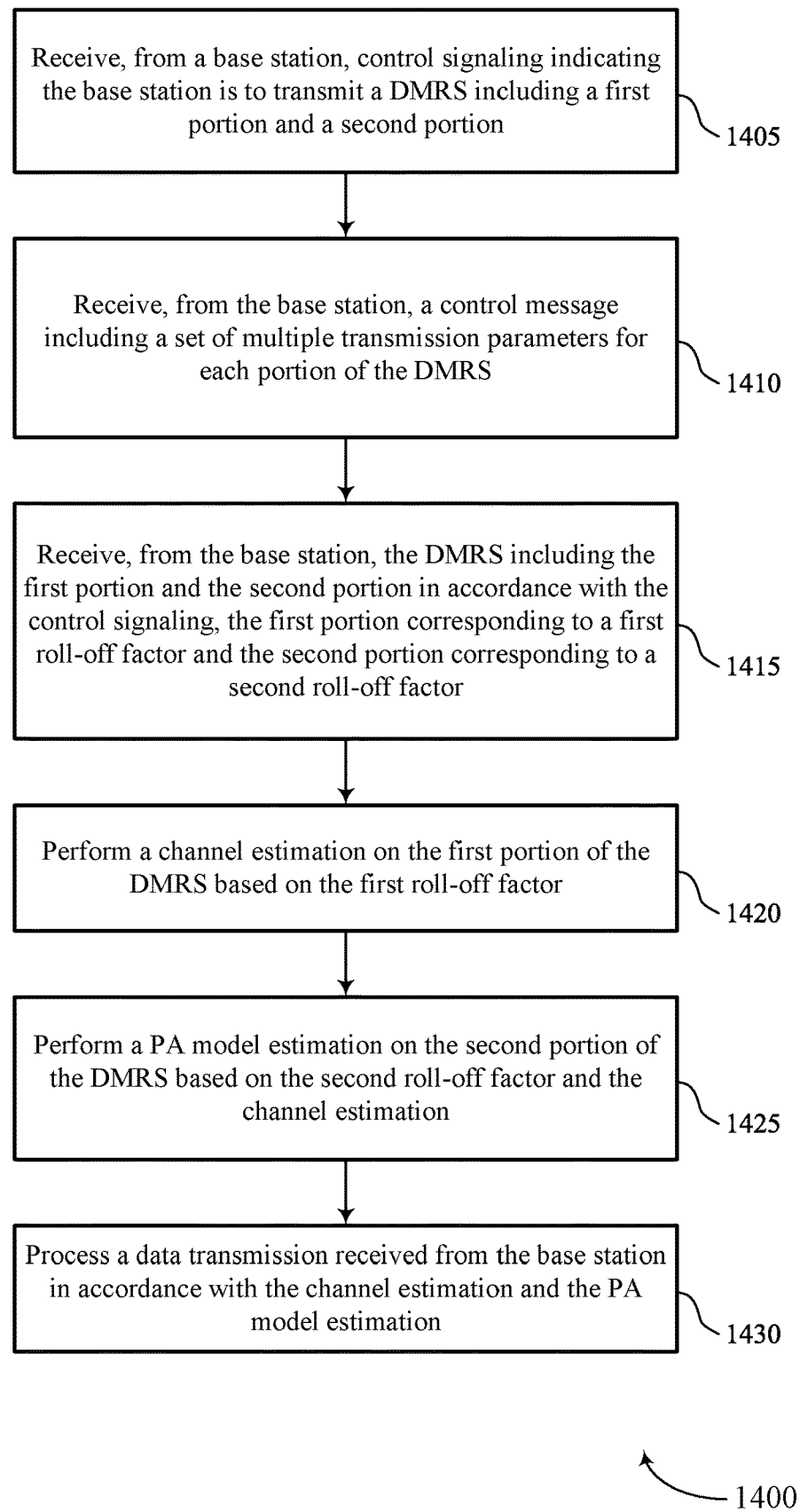

FIG. 14 shows a flowchart illustrating a method 1400 that supports reference signal design for channel estimation and PA modeling in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, control signaling indicating the base station is to transmit a DMRS including a first portion and a second portion. The operations of 1405 may be performed in accordance with examples as disclosed herein. In some examples, aspects of the operations of 1405 may be performed by a DMRS control signaling component 725 as described with reference to FIG. 7.

At 1410, the method may include receiving, from the base station, a control message including a set of multiple transmission parameters for each portion of the DMRS. The operations of 1410 may be performed in accordance with examples as disclosed herein. In some examples, aspects of the operations of 1410 may be performed by a DMRS parameter component 750 as described with reference to FIG. 7.

At 1415, the method may include receiving, from the base station, the DMRS including the first portion and the second portion in accordance with the control signaling, the first portion corresponding to a first roll-off factor and the second portion corresponding to a second roll-off factor. The operations of 1415 may be performed in accordance with examples as disclosed herein. In some examples, aspects of the operations of 1415 may be performed by a multi-portion DMRS component 730 as described with reference to FIG. 7.

At 1420, the method may include performing a channel estimation on the first portion of the DMRS based on the first roll-off factor. The operations of 1420 may be performed in accordance with examples as disclosed herein. In some examples, aspects of the operations of 1420 may be performed by a channel estimation component 735 as described with reference to FIG. 7.

At 1425, the method may include performing a PA model estimation on the second portion of the DMRS based on the second roll-off factor and the channel estimation. The operations of 1425 may be performed in accordance with examples as disclosed herein. In some examples, aspects of the operations of 1425 may be performed by a PA model estimation component 740 as described with reference to FIG. 7.

At 1430, the method may include processing a data transmission received from the base station in accordance with the channel estimation and the PA model estimation. The operations of 1430 may be performed in accordance with examples as disclosed herein. In some examples, aspects of the operations of 1430 may be performed by a data transmission processing component 745 as described with reference to FIG. 7.

Figure 15:
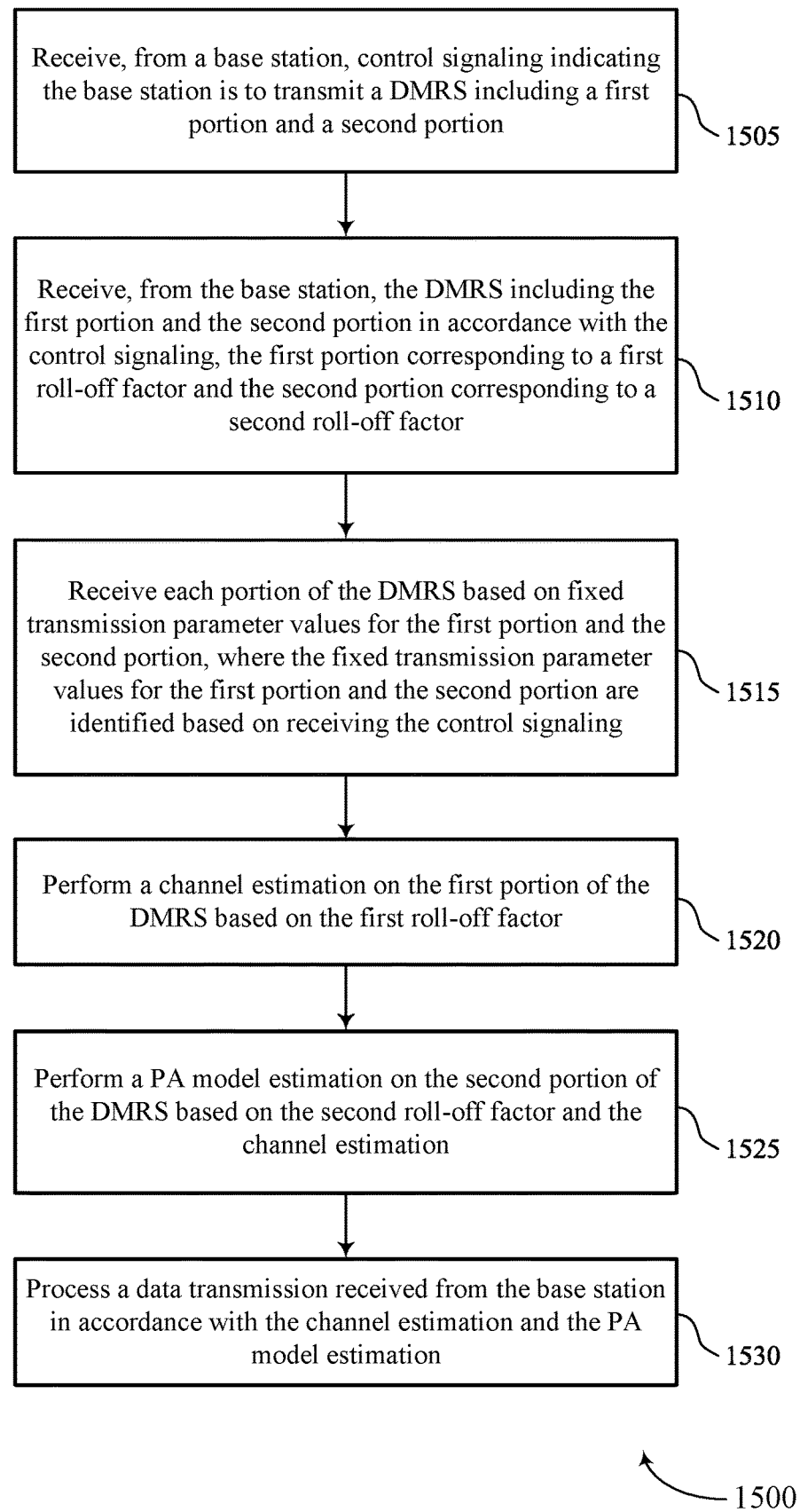

FIG. 15 shows a flowchart illustrating a method 1500 that supports reference signal design for channel estimation and PA modeling in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling indicating the base station is to transmit a DMRS including a first portion and a second portion. The operations of 1505 may be performed in accordance with examples as disclosed herein. In some examples, aspects of the operations of 1505 may be performed by a DMRS control signaling component 725 as described with reference to FIG. 7.

At 1510, the method may include receiving, from the base station, the DMRS including the first portion and the second portion in accordance with the control signaling, the first portion corresponding to a first roll-off factor and the second portion corresponding to a second roll-off factor. The operations of 1510 may be performed in accordance with examples as disclosed herein. In some examples, aspects of the operations of 1510 may be performed by a multi-portion DMRS component 730 as described with reference to FIG. 7.

At 1515, the method may include receiving each portion of the DMRS based on fixed transmission parameter values for the first portion and the second portion, where the fixed transmission parameter values for the first portion and the second portion are identified based on receiving the control signaling. The operations of 1515 may be performed in accordance with examples as disclosed herein. In some examples, aspects of the operations of 1515 may be performed by a DMRS parameter component 750 as described with reference to FIG. 7.

At 1520, the method may include performing a channel estimation on the first portion of the DMRS based on the first roll-off factor. The operations of 1520 may be performed in accordance with examples as disclosed herein. In some examples, aspects of the operations of 1520 may be performed by a channel estimation component 735 as described with reference to FIG. 7.

At 1525, the method may include performing a PA model estimation on the second portion of the DMRS based on the second roll-off factor and the channel estimation. The operations of 1525 may be performed in accordance with examples as disclosed herein. In some examples, aspects of the operations of 1525 may be performed by a PA model estimation component 740 as described with reference to FIG. 7.

At 1530, the method may include processing a data transmission received from the base station in accordance with the channel estimation and the PA model estimation. The operations of 1530 may be performed in accordance with examples as disclosed herein. In some examples, aspects of the operations of 1530 may be performed by a data transmission processing component 745 as described with reference to FIG. 7.

Figure 16:
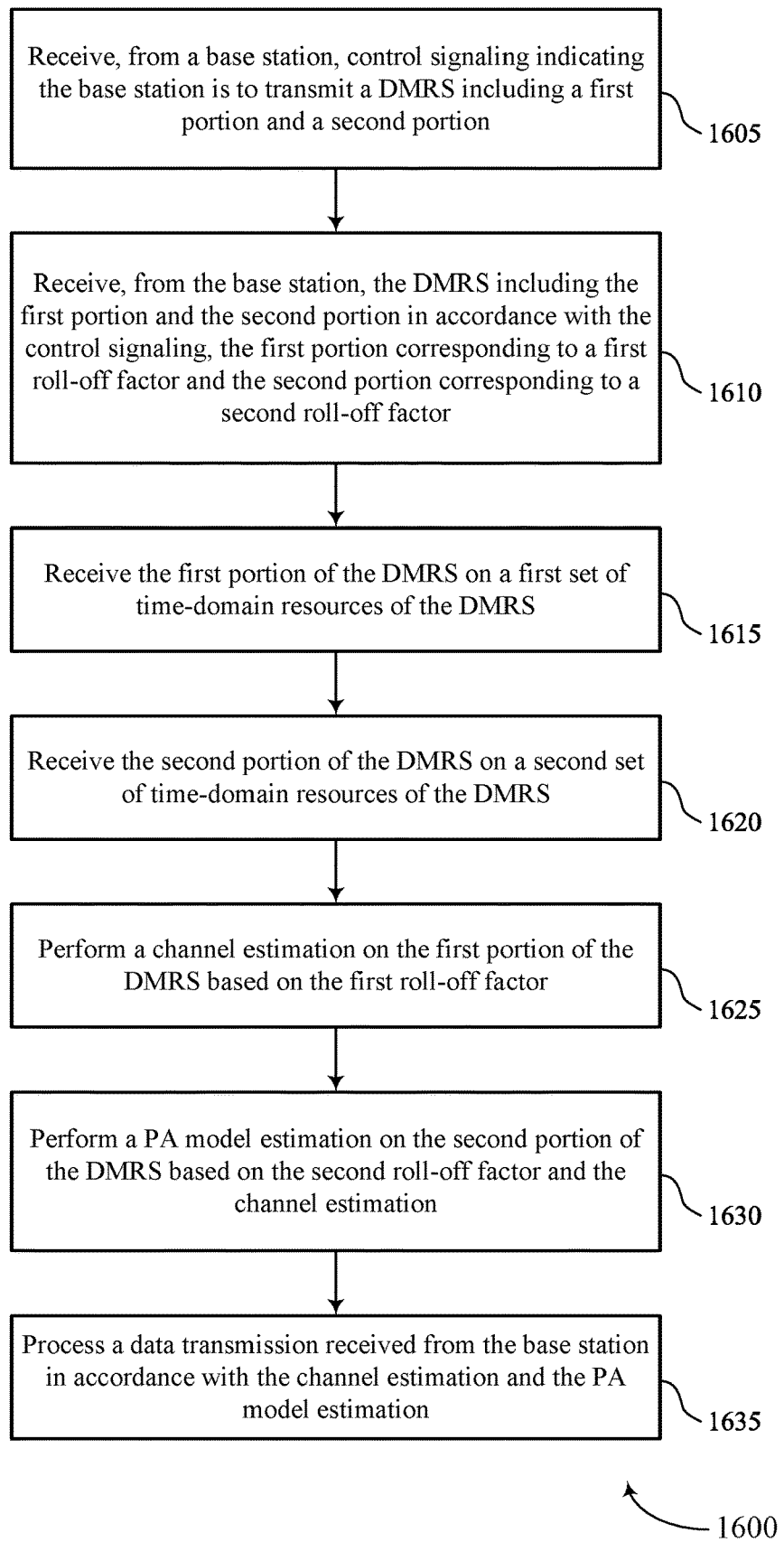

FIG. 16 shows a flowchart illustrating a method 1600 that supports reference signal design for channel estimation and PA modeling in accordance with aspects of the present disclosure. The operations of the method 1600 may be implemented by a UE or its components as described herein. For example, the operations of the method 1600 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling indicating the base station is to transmit a DMRS including a first portion and a second portion. The operations of 1605 may be performed in accordance with examples as disclosed herein. In some examples, aspects of the operations of 1605 may be performed by a DMRS control signaling component 725 as described with reference to FIG. 7.

At 1610, the method may include receiving, from the base station, the DMRS including the first portion and the second portion in accordance with the control signaling, the first portion corresponding to a first roll-off factor and the second portion corresponding to a second roll-off factor. The operations of 1610 may be performed in accordance with examples as disclosed herein. In some examples, aspects of the operations of 1610 may be performed by a multi-portion DMRS component 730 as described with reference to FIG. 7.

At 1615, the method may include receiving the first portion of the DMRS on a first set of time-domain resources of the DMRS. The operations of 1615 may be performed in accordance with examples as disclosed herein. In some examples, aspects of the operations of 1615 may be performed by a multi-portion DMRS component 730 as described with reference to FIG. 7.

At 1620, the method may include receiving the second portion of the DMRS on a second set of time-domain resources of the DMRS. The operations of 1620 may be performed in accordance with examples as disclosed herein. In some examples, aspects of the operations of 1620 may be performed by a multi-portion DMRS component 730 as described with reference to FIG. 7.

At 1625, the method may include performing a channel estimation on the first portion of the DMRS based on the first roll-off factor. The operations of 1625 may be performed in accordance with examples as disclosed herein. In some examples, aspects of the operations of 1625 may be performed by a channel estimation component 735 as described with reference to FIG. 7.

At 1630, the method may include performing a PA model estimation on the second portion of the DMRS based on the second roll-off factor and the channel estimation. The operations of 1630 may be performed in accordance with examples as disclosed herein. In some examples, aspects of the operations of 1630 may be performed by a PA model estimation component 740 as described with reference to FIG. 7.

At 1635, the method may include processing a data transmission received from the base station in accordance with the channel estimation and the PA model estimation. The operations of 1635 may be performed in accordance with examples as disclosed herein. In some examples, aspects of the operations of 1635 may be performed by a data transmission processing component 745 as described with reference to FIG. 7.

Figure 17:
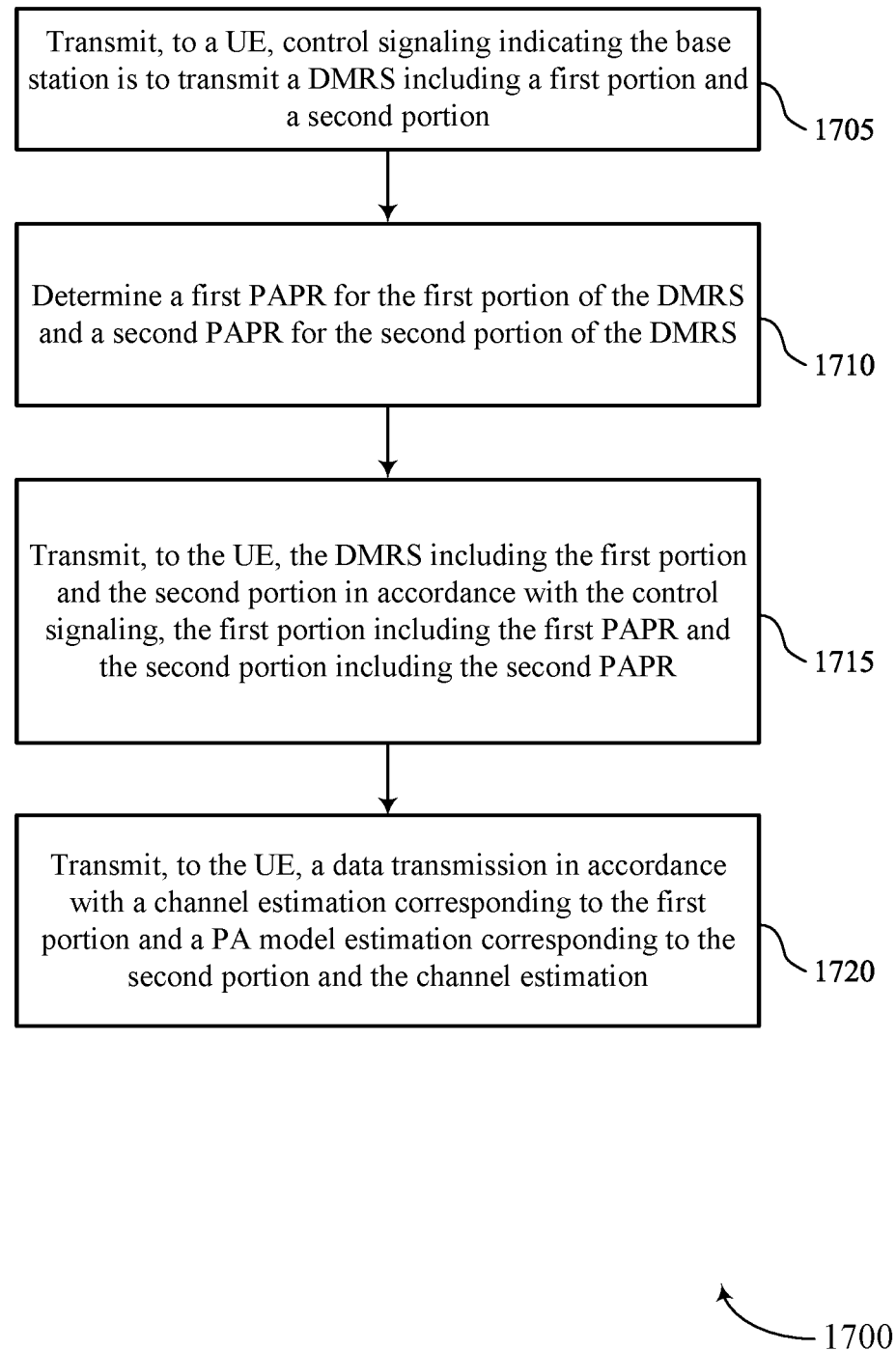

FIG. 17 shows a flowchart illustrating a method 1700 that supports reference signal design for channel estimation and PA modeling in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting, to a UE, control signaling indicating the base station is to transmit a DMRS including a first portion and a second portion. The operations of 1705 may be performed in accordance with examples as disclosed herein. In some examples, aspects of the operations of 1705 may be performed by a control signaling component 1125 as described with reference to FIG. 11.

At 1710, the method may include determining a first PAPR for the first portion of the DMRS and a second PAPR for the second portion of the DMRS. The operations of 1710 may be performed in accordance with examples as disclosed herein. In some examples, aspects of the operations of 1710 may be performed by a PAPR determination component 1130 as described with reference to FIG. 11.

At 1715, the method may include transmitting, to the UE, the DMRS including the first portion and the second portion in accordance with the control signaling, the first portion including the first PAPR and the second portion including the second PAPR. The operations of 1715 may be performed in accordance with examples as disclosed herein. In some examples, aspects of the operations of 1715 may be performed by a multi-portion DMRS transmission component 1135 as described with reference to FIG. 11.

At 1720, the method may include transmitting, to the UE, a data transmission in accordance with a channel estimation corresponding to the first portion and a PA model estimation corresponding to the second portion and the channel estimation. The operations of 1720 may be performed in accordance with examples as disclosed herein. In some examples, aspects of the operations of 1720 may be performed by a data transmission component 1140 as described with reference to FIG. 11.

Figure 18:
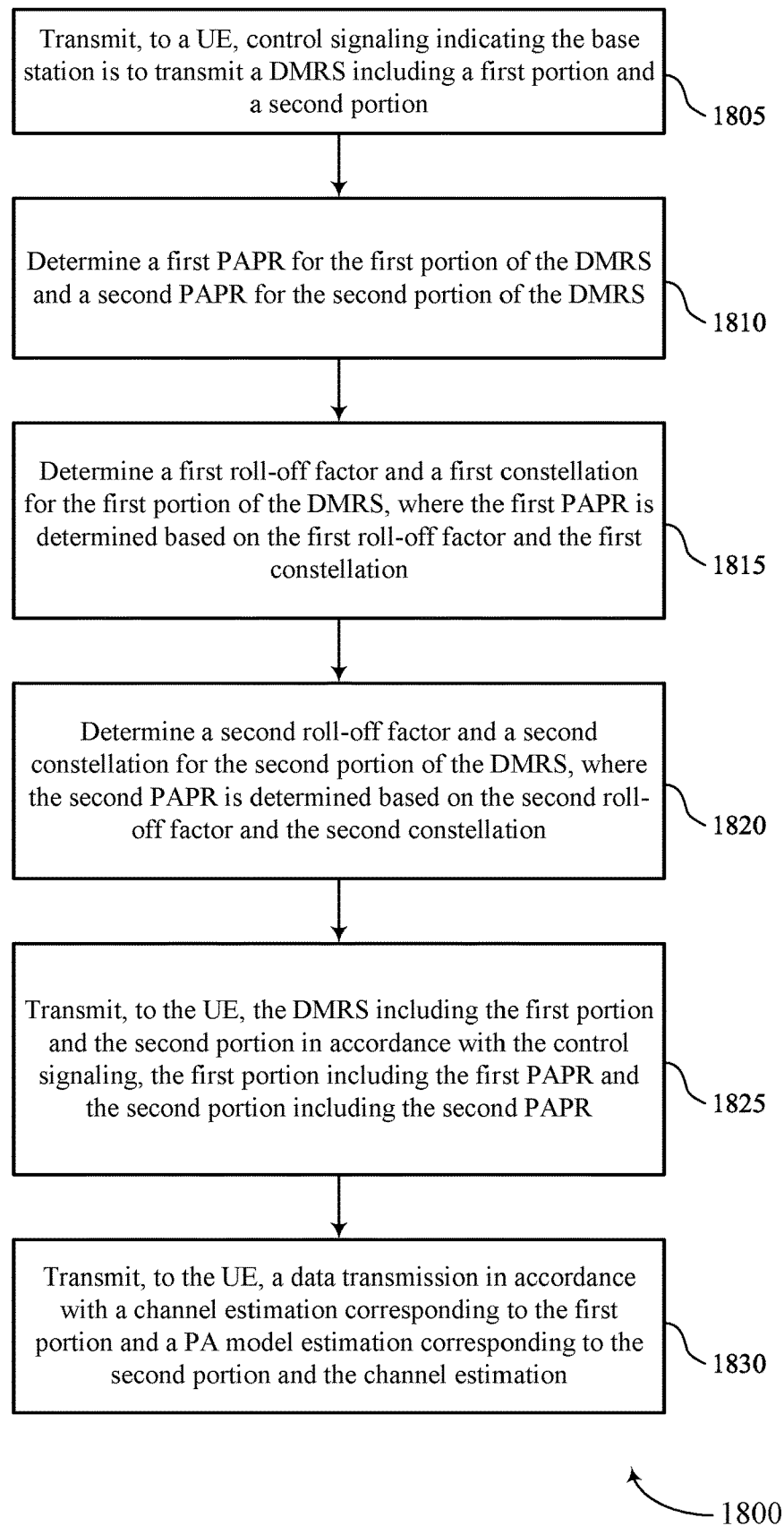

FIG. 18 shows a flowchart illustrating a method 1800 that supports reference signal design for channel estimation and PA modeling in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting, to a UE, control signaling indicating the base station is to transmit a DMRS including a first portion and a second portion. The operations of 1805 may be performed in accordance with examples as disclosed herein. In some examples, aspects of the operations of 1805 may be performed by a control signaling component 1125 as described with reference to FIG. 11.

At 1810, the method may include determining a first PAPR for the first portion of the DMRS and a second PAPR for the second portion of the DMRS. The operations of 1810 may be performed in accordance with examples as disclosed herein. In some examples, aspects of the operations of 1810 may be performed by a PAPR determination component 1130 as described with reference to FIG. 11.

At 1815, the method may include determining a first roll-off factor and a first constellation for the first portion of the DMRS, where the first PAPR is determined based on the first roll-off factor and the first constellation. The operations of 1815 may be performed in accordance with examples as disclosed herein. In some examples, aspects of the operations of 1815 may be performed by a PAPR determination component 1130 as described with reference to FIG. 11.

At 1820, the method may include determining a second roll-off factor and a second constellation for the second portion of the DMRS, where the second PAPR is determined based on the second roll-off factor and the second constellation. The operations of 1820 may be performed in accordance with examples as disclosed herein. In some examples, aspects of the operations of 1820 may be performed by a PAPR determination component 1130 as described with reference to FIG. 11.

At 1825, the method may include transmitting, to the UE, the DMRS including the first portion and the second portion in accordance with the control signaling, the first portion including the first PAPR and the second portion including the second PAPR. The operations of 1825 may be performed in accordance with examples as disclosed herein. In some examples, aspects of the operations of 1825 may be performed by a multi-portion DMRS transmission component 1135 as described with reference to FIG. 11.

At 1830, the method may include transmitting, to the UE, a data transmission in accordance with a channel estimation corresponding to the first portion and a PA model estimation corresponding to the second portion and the channel estimation. The operations of 1830 may be performed in accordance with examples as disclosed herein. In some examples, aspects of the operations of 1830 may be performed by a data transmission component 1140 as described with reference to FIG. 11.

The following provides an overview of aspects of the present disclosure:

Aspect 1: A method for wireless communications at a UE, comprising: receiving, from a base station, control signaling indicating the base station is to transmit a demodulation reference signal comprising a first portion and a second portion; receiving, from the base station, the demodulation reference signal comprising the first portion and the second portion in accordance with the control signaling, the first portion corresponding to a first roll-off factor and the second portion corresponding to a second roll-off factor; performing a channel estimation on the first portion of the demodulation reference signal based at least in part on the first roll-off factor; performing a power amplifier model estimation on the second portion of the demodulation reference signal based at least in part on the second roll-off factor and the channel estimation; and processing a data transmission received from the base station in accordance with the channel estimation and the power amplifier model estimation.

Aspect 2: The method of aspect 1, further comprising: receiving, from the base station, a control message comprising a plurality of transmission parameters for each portion of the demodulation reference signal, wherein the demodulation reference signal is received based at least in part on the plurality of transmission parameters.

Aspect 3: The method of aspect 2, wherein the plurality of transmission parameters comprises a roll-off factor for each portion of the demodulation reference signal, a constellation used for each portion of the demodulation reference signal, or a combination thereof.

Aspect 4: The method of aspect 1, wherein receiving the demodulation reference signal comprises: receiving each portion of the demodulation reference signal based at least in part on fixed transmission parameter values for the first portion and the second portion, wherein the fixed transmission parameter values for the first portion and the second portion are identified based at least in part on receiving the control signaling.

Aspect 5: The method of any of aspects 1 through 4, further comprising: transmitting, to the base station, a request to update a channel estimation model, wherein the control signaling is received based at least in part on transmitting the request.

Aspect 6: The method of any of aspects 1 through 4, further comprising: receiving, from the base station, a request to update a channel estimation model, wherein the control signaling is received based at least in part on receiving the request.

Aspect 7: The method of any of aspects 1 through 6, wherein the first portion of the demodulation reference signal comprises a first peak-to-average power ratio for performing the channel estimation, and the second portion of the demodulation reference signal comprises a second peak-to-average power ratio for performing the power amplifier model estimation, the second peak-to-average power ratio being higher than the first peak-to-average power ratio.

Aspect 8: The method of any of aspects 1 through 7, wherein receiving the demodulation reference signal comprising the first portion and the second portion further comprises: receiving the first portion of the demodulation reference signal on a first set of time-domain resources of the demodulation reference signal; and receiving the second portion of the demodulation reference signal on a second set of time-domain resources of the demodulation reference signal.

Aspect 9: The method of any of aspects 1 through 8, wherein the first roll-off factor is used for a first shaping filter applied to the first portion of the demodulation reference signal, and the second roll-off factor is used for a second shaping filter applied to the second portion of the demodulation reference signal, wherein the first shaping filter and the second shaping filter are a same pulse shaping filter or different pulse shaping filters.

Aspect 10: The method of any of aspects 1 through 9, wherein the second roll-off factor and a constellation order used for the second portion of the demodulation reference signal are a same roll-off factor and a same constellation order used for the data transmission.

Aspect 11: The method of any of aspects 1 through 10, wherein the power amplifier model estimation comprises a power amplifier non-linearity model estimation used to estimate a non-linearity error for a digital post distortion algorithm.

Aspect 12: The method of any of aspects 1 through 11, wherein the demodulation reference signal comprising the two portions comprises a single carrier waveform.

Aspect 13: A method for wireless communications at a base station, comprising: transmitting, to a UE, control signaling indicating the base station is to transmit a demodulation reference signal comprising a first portion and a second portion; determining a first peak-to-average power ratio for the first portion of the demodulation reference signal and a second peak-to-average power ratio for the second portion of the demodulation reference signal; transmitting, to the UE, the demodulation reference signal comprising the first portion and the second portion in accordance with the control signaling, the first portion comprising the first peak-to-average power ratio and the second portion comprising the second peak-to-average power ratio; and transmitting, to the UE, a data transmission in accordance with a channel estimation corresponding to the first portion and a power amplifier model estimation corresponding to the second portion and the channel estimation.

Aspect 14: The method of aspect 13, further comprising: transmitting, to the UE, a control message comprising a plurality of transmission parameters for each portion of the demodulation reference signal, wherein the demodulation reference signal is transmitted based at least in part on the plurality of transmission parameters.

Aspect 15: The method of aspect 14, wherein the plurality of transmission parameters comprises a roll-off factor for each portion of the demodulation reference signal, a constellation used for each portion of the demodulation reference signal, or a combination thereof.

Aspect 16: The method of aspect 13, wherein transmitting the demodulation reference signal comprises: transmitting each portion of the demodulation reference signal based at least in part on fixed transmission parameter values for the first portion and the second portion.

Aspect 17: The method of any of aspects 13 through 16, further comprising: receiving, from the UE, a request to update a channel estimation model, wherein the control signaling is transmitted based at least in part on receiving the request.

Aspect 18: The method of any of aspects 13 through 16, further comprising: transmitting, to the UE, a request to update a channel estimation model, wherein the control signaling is transmitted based at least in part on transmitting the request.

Aspect 19: The method of any of aspects 13 through 18, wherein determining the first peak-to-average power ratio and the second peak-to-average power ratio comprises: determining a first roll-off factor and a first constellation for the first portion of the demodulation reference signal, wherein the first peak-to-average power ratio is determined based at least in part on the first roll-off factor and the first constellation; and determining a second roll-off factor and a second constellation for the second portion of the demodulation reference signal, wherein the second peak-to-average power ratio is determined based at least in part on the second roll-off factor and the second constellation.

Aspect 20: The method of aspect 19, wherein the first roll-off factor is used for a first shaping filter applied to the first portion of the demodulation reference signal, and the second roll-off factor is used for a second shaping filter applied to the second portion of the demodulation reference signal, wherein the first shaping filter and the second shaping filter are a same pulse shaping filter or different pulse shaping filters.

Aspect 21: The method of any of aspects 19 through 20, wherein the second roll-off factor and the second constellation for the second portion of the demodulation reference signal are a same roll-off factor and a same constellation order used for the data transmission.

Aspect 22: The method of any of aspects 13 through 21, wherein transmitting the demodulation reference signal comprising the first portion and the second portion further comprises: transmitting the first portion of the demodulation reference signal on a first set of time-domain resources of the demodulation reference signal; and transmitting the second portion of the demodulation reference signal on a second set of time-domain resources of the demodulation reference signal.

Aspect 23: The method of any of aspects 13 through 22, wherein the power amplifier model estimation comprises a power amplifier non-linearity model estimation used to estimate a non-linearity error for a digital post distortion algorithm.

Aspect 24: The method of any of aspects 13 through 23, wherein the demodulation reference signal comprising the two portions comprises a single carrier waveform.

Aspect 25: An apparatus for wireless communications at a UE, comprising a processor; memory coupled with the processor; and instructions stored in the memory and executable by the processor to cause the apparatus to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a base station, comprising a processor; memory coupled with the processor; and instructions stored in the memory and executable by the processor to cause the apparatus to perform a method of any of aspects 13 through 24.

Aspect 29: An apparatus for wireless communications at a base station, comprising at least one means for performing a method of any of aspects 13 through 24.

Aspect 30: A non-transitory computer-readable medium storing code for wireless communications at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving, from a base station, control signaling indicating the base station is to transmit a demodulation reference signal comprising a first portion and a second portion;
   receiving, from the base station, the demodulation reference signal comprising the first portion and the second portion in accordance with the control signaling, the first portion corresponding to a first roll-off factor and the second portion corresponding to a second roll-off factor;
   performing a channel estimation on the first portion of the demodulation reference signal based at least in part on the first roll-off factor;
   performing a power amplifier model estimation on the second portion of the demodulation reference signal based at least in part on the second roll-off factor and the channel estimation; and
   processing a data transmission received from the base station in accordance with the channel estimation and the power amplifier model estimation.

2. The method of claim 1, further comprising:
   receiving, from the base station, a control message comprising a plurality of transmission parameters for each portion of the demodulation reference signal, wherein the demodulation reference signal is received based at least in part on the plurality of transmission parameters.

3. The method of claim 2, wherein the plurality of transmission parameters comprises a roll-off factor for each portion of the demodulation reference signal, a constellation used for each portion of the demodulation reference signal, or a combination thereof.

4. The method of claim 1, wherein receiving the demodulation reference signal comprises:
   receiving each portion of the demodulation reference signal based at least in part on fixed transmission parameter values for the first portion and the second portion, wherein the fixed transmission parameter values for the first portion and the second portion are identified based at least in part on receiving the control signaling.

5. The method of claim 1, further comprising:
   transmitting, to the base station, a request to update a channel estimation model, wherein the control signaling is received based at least in part on transmitting the request.

6. The method of claim 1, further comprising:
   receiving, from the base station, a request to update a channel estimation model, wherein the control signaling is received based at least in part on receiving the request.

7. The method of claim 1, wherein the first portion of the demodulation reference signal comprises a first peak-to-average power ratio for performing the channel estimation, and the second portion of the demodulation reference signal comprises a second peak-to-average power ratio for performing the power amplifier model estimation, the second peak-to-average power ratio being higher than the first peak-to-average power ratio.

8. The method of claim 1, wherein receiving the demodulation reference signal comprising the first portion and the second portion further comprises:
receiving the first portion of the demodulation reference signal on a first set of time-domain resources of the demodulation reference signal; and
receiving the second portion of the demodulation reference signal on a second set of time-domain resources of the demodulation reference signal.

9. The method of claim 1, wherein the first roll-off factor is used for a first shaping filter applied to the first portion of the demodulation reference signal, and the second roll-off factor is used for a second shaping filter applied to the second portion of the demodulation reference signal, wherein the first shaping filter and the second shaping filter are a same pulse shaping filter or different pulse shaping filters.

10. The method of claim 1, wherein the second roll-off factor and a constellation order used for the second portion of the demodulation reference signal are a same roll-off factor and a same constellation order used for the data transmission.

11. The method of claim 1, wherein the power amplifier model estimation comprises a power amplifier non-linearity model estimation used to estimate a non-linearity error for a digital post distortion algorithm.

12. The method of claim 1, wherein the demodulation reference signal comprising the two portions comprises a single carrier waveform.

13. A method for wireless communications at a base station, comprising:
transmitting, to a user equipment (UE), control signaling indicating the base station is to transmit a demodulation reference signal comprising a first portion and a second portion;
determining a first peak-to-average power ratio for the first portion of the demodulation reference signal and a second peak-to-average power ratio for the second portion of the demodulation reference signal;
transmitting, to the UE, the demodulation reference signal comprising the first portion and the second portion in accordance with the control signaling, the first portion comprising the first peak-to-average power ratio and the second portion comprising the second peak-to-average power ratio; and
transmitting, to the UE, a data transmission in accordance with a channel estimation corresponding to the first portion and a power amplifier model estimation corresponding to the second portion and the channel estimation.

14. The method of claim 13, further comprising:
transmitting, to the UE, a control message comprising a plurality of transmission parameters for each portion of the demodulation reference signal, wherein the demodulation reference signal is transmitted based at least in part on the plurality of transmission parameters.

15. The method of claim 14, wherein the plurality of transmission parameters comprises a roll-off factor for each portion of the demodulation reference signal, a constellation used for each portion of the demodulation reference signal, or a combination thereof.

16. The method of claim 13, wherein transmitting the demodulation reference signal comprises:
transmitting each portion of the demodulation reference signal based at least in part on fixed transmission parameter values for the first portion and the second portion.

17. The method of claim 13, further comprising:
receiving, from the UE, a request to update a channel estimation model, wherein the control signaling is transmitted based at least in part on receiving the request.

18. The method of claim 13, further comprising:
transmitting, to the UE, a request to update a channel estimation model, wherein the control signaling is transmitted based at least in part on transmitting the request.

19. The method of claim 13, wherein determining the first peak-to-average power ratio and the second peak-to-average power ratio comprises:
determining a first roll-off factor and a first constellation for the first portion of the demodulation reference signal, wherein the first peak-to-average power ratio is determined based at least in part on the first roll-off factor and the first constellation; and
determining a second roll-off factor and a second constellation for the second portion of the demodulation reference signal, wherein the second peak-to-average power ratio is determined based at least in part on the second roll-off factor and the second constellation.

20. The method of claim 19, wherein the first roll-off factor is used for a first shaping filter applied to the first portion of the demodulation reference signal, and the second roll-off factor is used for a second shaping filter applied to the second portion of the demodulation reference signal, wherein the first shaping filter and the second shaping filter are a same pulse shaping filter or different pulse shaping filters.

21. The method of claim 19, wherein the second roll-off factor and the second constellation for the second portion of the demodulation reference signal are a same roll-off factor and a same constellation order used for the data transmission.

22. The method of claim 13, wherein transmitting the demodulation reference signal comprising the first portion and the second portion further comprises:
transmitting the first portion of the demodulation reference signal on a first set of time-domain resources of the demodulation reference signal; and
transmitting the second portion of the demodulation reference signal on a second set of time-domain resources of the demodulation reference signal.

23. The method of claim 13, wherein the power amplifier model estimation comprises a power amplifier non-linearity model estimation used to estimate a non-linearity error for a digital post distortion algorithm.

24. The method of claim 13, wherein the demodulation reference signal comprising the two portions comprises a single carrier waveform.

25. An apparatus for wireless communications at a user equipment (UE), comprising:
a processor;
memory coupled with the processor; and
instructions stored in the memory and executable by the processor to cause the apparatus to:

receive, from a base station, control signaling indicating the base station is to transmit a demodulation reference signal comprising a first portion and a second portion;

receive, from the base station, the demodulation reference signal comprising the first portion and the second portion in accordance with the control signaling, the first portion corresponding to a first roll-off factor and the second portion corresponding to a second roll-off factor;

perform a channel estimation on the first portion of the demodulation reference signal based at least in part on the first roll-off factor;

perform a power amplifier model estimation on the second portion of the demodulation reference signal based at least in part on the second roll-off factor and the channel estimation; and process a data transmission received from the base station in accordance with the channel estimation and the power amplifier model estimation.

26. The apparatus of claim 25, wherein the instructions are further executable by the processor to cause the apparatus to:

receive, from the base station, a control message comprising a plurality of transmission parameters for each portion of the demodulation reference signal, wherein the demodulation reference signal is received based at least in part on the plurality of transmission parameters.

27. The apparatus of claim 25, wherein the instructions to receive the demodulation reference signal are executable by the processor to cause the apparatus to:

receive each portion of the demodulation reference signal based at least in part on fixed transmission parameter values for the first portion and the second portion, wherein the fixed transmission parameter values for the first portion and the second portion are identified based at least in part on receiving the control signaling.

28. The apparatus of claim 25, wherein the instructions are further executable by the processor to cause the apparatus to:

transmit, to the base station, a request to update a channel estimation model, wherein the control signaling is received based at least in part on transmitting the request.

29. The apparatus of claim 25, wherein the instructions are further executable by the processor to cause the apparatus to:

receive, from the base station, a request to update a channel estimation model, wherein the control signaling is received based at least in part on receiving the request.

30. An apparatus for wireless communications at a base station, comprising:

a processor;

memory coupled with the processor; and instructions stored in the memory and executable by the processor to cause the apparatus to:

transmit, to a user equipment (UE), control signaling indicating the base station is to transmit a demodulation reference signal comprising a first portion and a second portion;

determine a first peak-to-average power ratio for the first portion of the demodulation reference signal and a second peak-to-average power ratio for the second portion of the demodulation reference signal;

transmit, to the UE, the demodulation reference signal comprising the first portion and the second portion in accordance with the control signaling, the first portion comprising the first peak-to-average power ratio and the second portion comprising the second peak-to-average power ratio; and transmit, to the UE, a data transmission in accordance with a channel estimation corresponding to the first portion and a power amplifier model estimation corresponding to the second portion and the channel estimation.

* * * * *